(12) United States Patent
Wang et al.

(10) Patent No.: US 11,731,546 B1
(45) Date of Patent: Aug. 22, 2023

(54) SEAT BACK RELEASE BLOCKER

(71) Applicant: Waymo LLC, Mountain View, CA (US)

(72) Inventors: Zhaokun Wang, Mountain View, CA (US); Richard Morabito, Grosse Ile, MI (US); Thomas Southworth, Royal Oak, MI (US); Dillon Arellano, Royal Oak, MI (US)

(73) Assignee: Waymo LLC, Mountain View, CA (US)

( * ) Notice: Subject to any disclaimer, the term of this patent is extended or adjusted under 35 U.S.C. 154(b) by 478 days.

(21) Appl. No.: 16/927,279

(22) Filed: Jul. 13, 2020

(51) Int. Cl.
*B60N 2/90* (2018.01)
*B60N 2/30* (2006.01)
*B60W 60/00* (2020.01)
*B60N 2/01* (2006.01)

(52) U.S. Cl.
CPC ............ *B60N 2/938* (2018.02); *B60N 2/01* (2013.01); *B60N 2/30* (2013.01); *B60W 60/0025* (2020.02); *B60N 2002/952* (2018.02)

(58) Field of Classification Search
None
See application file for complete search history.

(56) References Cited

U.S. PATENT DOCUMENTS

| | | | |
|---|---|---|---|
| 2,668,076 A * | 2/1954 | Troche | E05C 1/145 |
| | | | 292/DIG. 31 |
| 2,815,796 A * | 12/1957 | Lobanoff | B60N 2/20 |
| | | | 296/68.1 |
| 3,391,256 A | 7/1968 | Nawman | |
| 4,881,767 A | 11/1989 | Kondo | |
| 4,958,877 A | 9/1990 | Lezotte et al. | |
| 4,984,849 A | 1/1991 | Rist | |
| 5,116,099 A | 5/1992 | Kwasnik et al. | |
| D333,083 S | 2/1993 | Stenger | |
| 5,816,640 A * | 10/1998 | Nishimura | B60R 5/006 |
| | | | 296/37.16 |
| 6,132,000 A | 10/2000 | Tanaka | |
| 6,302,484 B1 * | 10/2001 | Araki | B60N 2/2245 |
| | | | 296/65.09 |

(Continued)

FOREIGN PATENT DOCUMENTS

| | | | | |
|---|---|---|---|---|
| CN | 205239218 U | * | 5/2016 | |
| DE | 102018104598 B4 | * | 5/2022 | ........... B60N 2/2245 |

(Continued)

*Primary Examiner* — David E Allred
(74) *Attorney, Agent, or Firm* — Botos Churchill IP Law LLP

(57) ABSTRACT

The technology provides a seat release blocker that covers a seat release latching mechanism, where the latching mechanism would enable a passenger to fold down one or more seats of a vehicle. This can be particularly beneficial when the vehicle is operating in an autonomous driving mode, because certain areas within the vehicle may be restricted from passenger access. For instance, access to the trunk or cargo area may be limited to authorized service personnel. The seat release blocker includes a cover member that is fixedly secured to a seat such as a middle seat, using one or more fastener members such as a screw. Once the cover is releasably secured to the seat, the side of the cover with the fasteners may be completely or substantially covered by the side of an adjacent seat.

20 Claims, 20 Drawing Sheets

(56) References Cited

U.S. PATENT DOCUMENTS

| | | | |
|---|---|---|---|
| 6,341,820 B1 | 1/2002 | Kimura et al. | |
| 7,188,906 B2 * | 3/2007 | Christoffel et al. | |
| 9,381,837 B2 * | 7/2016 | Tone | B60N 2/3075 |
| 9,994,129 B1 * | 6/2018 | Shirokane | B60N 2/2245 |
| 11,167,668 B2 * | 11/2021 | Kondo | B60N 2/206 |
| 11,170,751 B1 * | 11/2021 | Lee | G10K 11/1783 |
| 2006/0250013 A1 * | 11/2006 | Shao | B60N 2/20 |
| | | | 297/366 |
| 2008/0012379 A1 * | 1/2008 | Miller | B60N 2/305 |
| | | | 296/65.03 |
| 2012/0228910 A1 * | 9/2012 | Kim | B60N 2/1842 |
| | | | 297/257 |
| 2013/0019540 A1 * | 1/2013 | Magnus | A47C 7/44 |
| | | | 52/8 |
| 2014/0339835 A1 | 11/2014 | Wepf | |
| 2015/0217662 A1 * | 8/2015 | Tone | B60N 2/206 |
| | | | 296/66 |
| 2016/0031490 A1 * | 2/2016 | Lawrence | E05B 53/00 |
| | | | 296/191 |
| 2018/0079334 A1 * | 3/2018 | Zheng | B60N 2/366 |
| 2018/0257520 A1 * | 9/2018 | Shirai | B60N 2/366 |
| 2019/0092192 A1 * | 3/2019 | Beenen | B60R 7/00 |
| 2020/0001751 A1 * | 1/2020 | Di Giusto | B60N 2/686 |
| 2021/0253008 A1 * | 8/2021 | Morabito | E05B 79/04 |

FOREIGN PATENT DOCUMENTS

| | | | |
|---|---|---|---|
| JP | 2013141934 A | * | 7/2013 |
| KR | 20070060888 A | * | 6/2007 |

\* cited by examiner

220

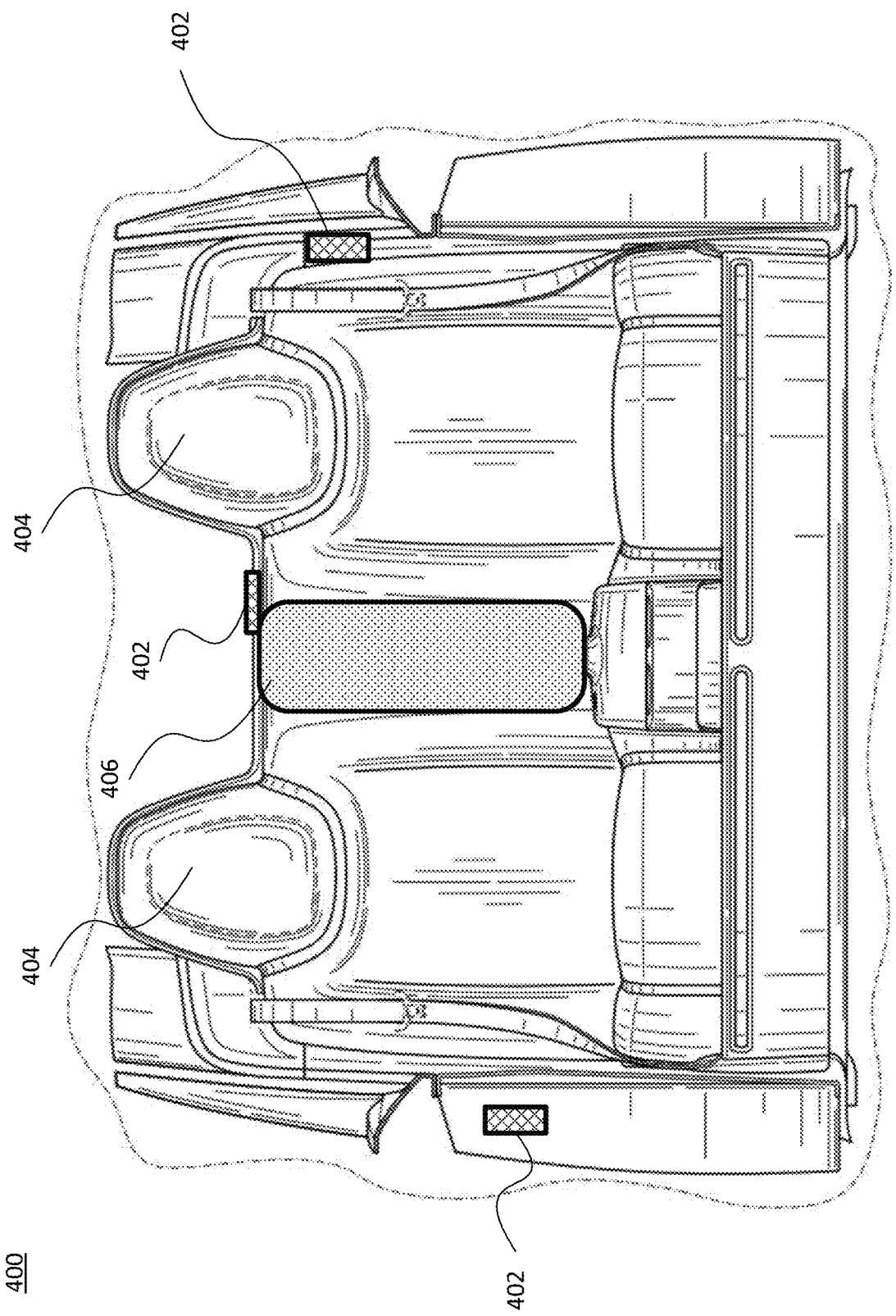

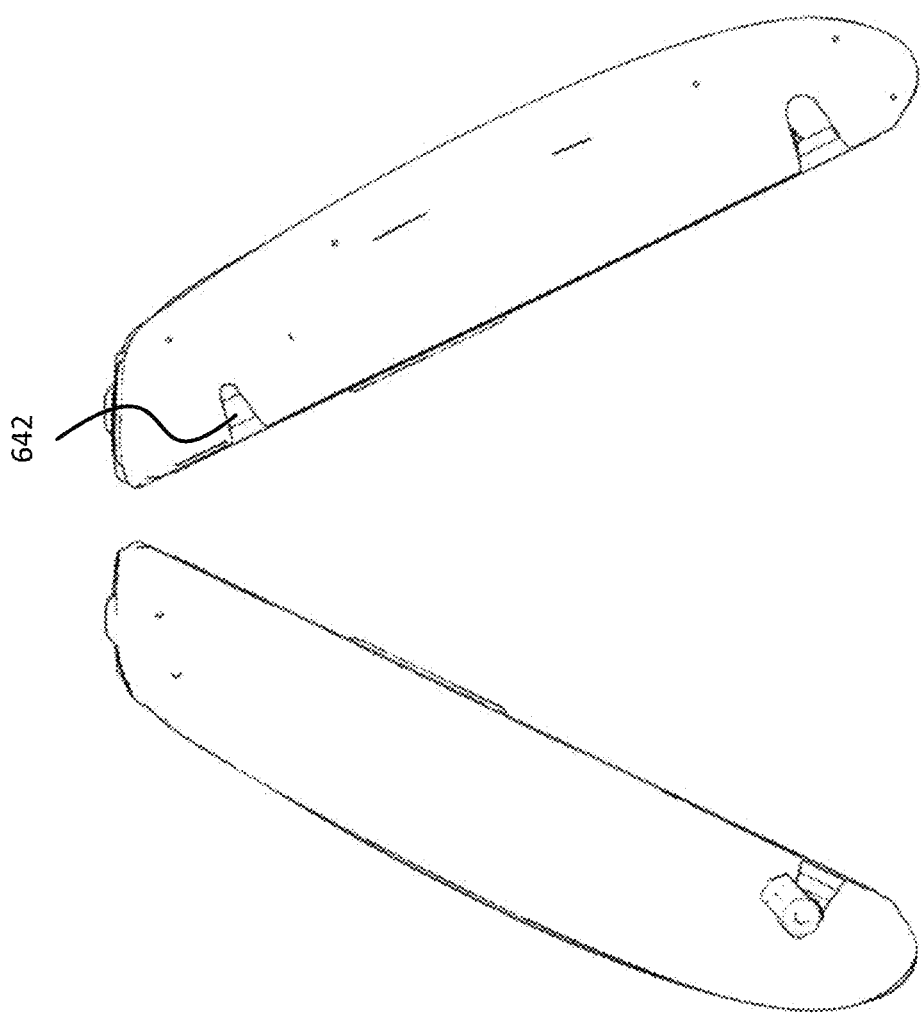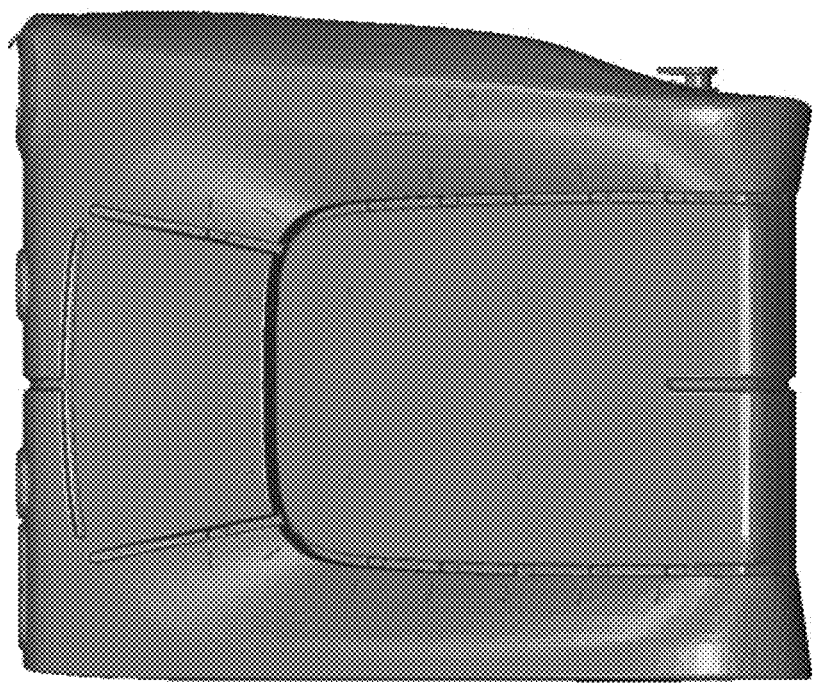

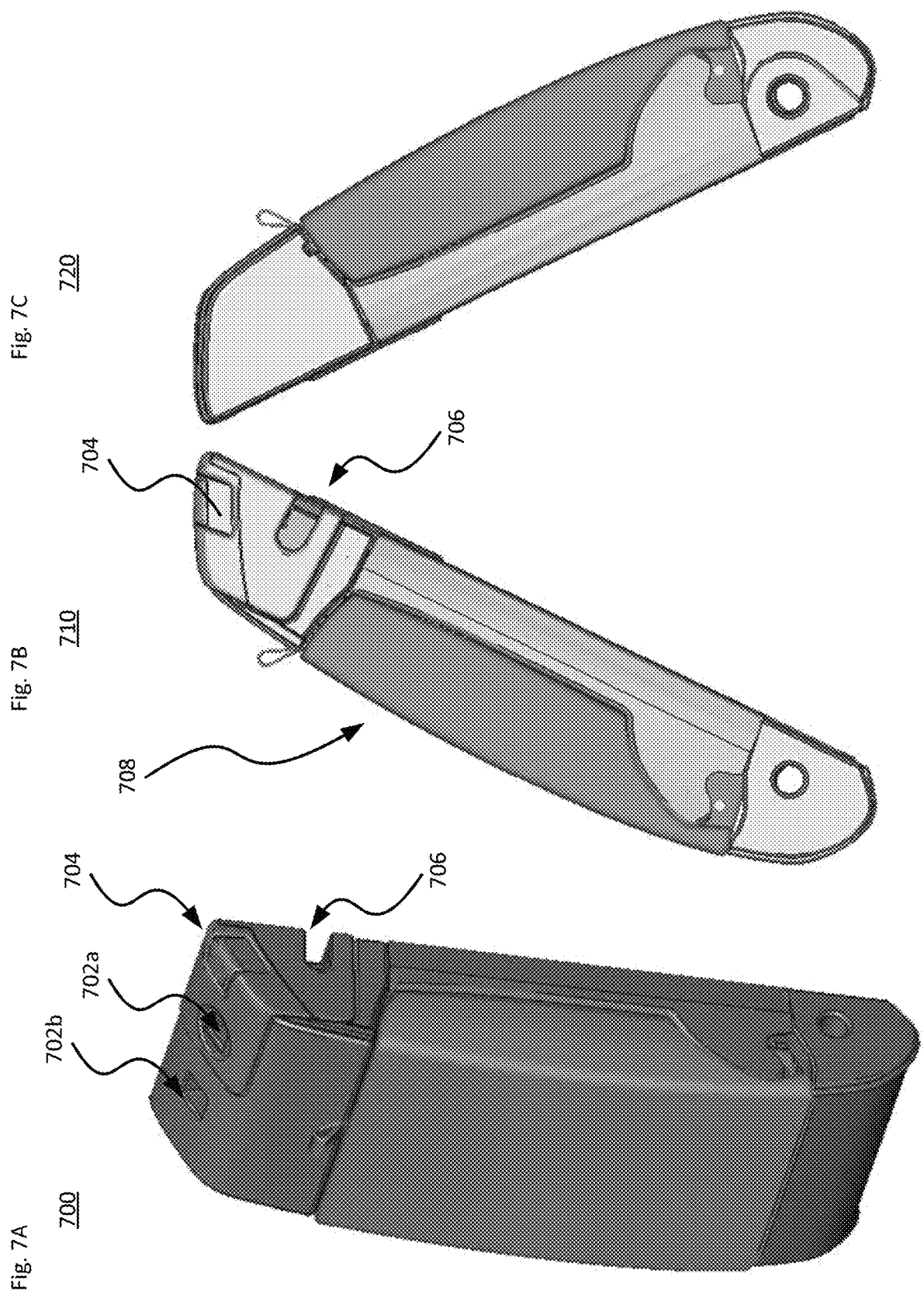

SEAT BACK RELEASE BLOCKER

CROSS-REFERENCE TO RELATED APPLICATIONS

This application is related to U.S. patent application Ser. No. 16/799,105, filed Feb. 24, 2020, entitled "Lockout Assembly for Folding Vehicle Seats", the entire disclosure of which is incorporated by reference herein.

BACKGROUND

Autonomous vehicles, such as vehicles that do not require a human driver, can be used to aid in the transport of passengers from one location to another. Such vehicles may operate in a fully autonomous mode without a person providing driving input, or in a partially autonomous mode with a driver having control over one or more aspects of vehicle operation.

BRIEF SUMMARY

When operating in an autonomous driving mode, certain areas within the vehicle may be restricted from passenger access. For instance, access to the trunk or cargo area may be limited to authorized personnel, such as vehicle service personnel. However, in many vehicles the trunk can be readily accessed, for instance via a latching mechanism located along one or more of the second row of seats, on an armrest portion of a seat, adjacent to the door, or elsewhere within the vehicle cabin. Aspects of the technology provide an easy to install blocker mechanism that prevents passengers from accessing the latching mechanism, thereby restricting access to the trunk or other storage compartment.

According to one aspect, a seat release blocker for a vehicle configured to operate in an autonomous driving mode is provided. The seat release blocker comprises a cover and one or more fasteners. The cover has at least a top surface and a side surface, which is configured to cover an actuator disposed along a seat of the vehicle that actuates a release element in order to enable the seat to fold down. The side surface is generally perpendicular to the top surface, and the side surface includes a set of receptacles each having an opening therethrough. The one or more fasteners are operatively coupled to the set of receptacles. The one or more fasteners are configured to secure the cover to the seat of the vehicle. When the cover is fixedly secured by the one or more fasteners to the seat of the vehicle, the cover is adapted to prevent passenger access to the actuator so that seat of the vehicle cannot be folded down. In an example, the cover further includes a rear surface disposed generally perpendicular to the top surface and the side surface.

The top surface may include an opening therethrough, with the opening being adapted to receive a tool so that the actuator is actuatable by the tool. The cover may consist essentially of the top, side and rear sides. The top, side and rear surfaces may come together along a corner area of the cover. Here, an interior surface of the corner area of the cover may be contoured to conform to a corner of the seat.

In another example, a perimeter region of an interior of at least the side surface of the cover is thicker than another region of the interior of at least the side surface. In this case, the opening for each receptacle of the set of receptacles may be disposed along the perimeter region.

The cover may be formed of a single, unitary cover member. In this case, the unitary cover member may form a continuous surface therealong other than the set of receptacles and an opening along the top surface, in which the opening is adapted to receive a tool so that the actuator is actuatable by the tool. The set of receptacles may comprise a pair of receptacles, and each receptacle may comprise a circular rim extending away from the side surface.

According to another aspect, a seat assembly of a vehicle configured to operate in an autonomous driving mode is provided. The seat assembly comprises one or more seats configured for use in the vehicle. The one or more seats are foldable from an upright position to a folded position upon engagement of a latch release mechanism. The seat assembly also includes the seat release blocker as described above. The cover of the seat release blocker is fixedly secured by the one or more fasteners to a given one of the one or more seats of the vehicle. The cover prevents passenger access to the latch release mechanism in order to prevent the given seat of the vehicle from being folded down.

The one or more seats may include a middle seat and a side seat adjacent to the middle seat. In this case, the cover may be fixedly secured to the middle seat. Here, the cover may further include a rear surface disposed generally perpendicular to the top surface and the side surface, where the top, side and rear surfaces come together along a corner area of the cover, and an interior surface of the corner area of the cover is contoured to conform to a corner of the middle seat. A side of the side seat may cover the side surface of the seat release blocker.

According to a further aspect, a vehicle is provided that is configured to operate in an autonomous driving mode. The vehicle includes the seat assembly as described above, and a driving system configured to operate the vehicle in the autonomous driving mode.

The one or more seats may include a middle seat and a side seat adjacent to the middle seat, in which the middle and side seats may be positioned along a second row of seats within a passenger compartment of the vehicle. The one or more seats may include a middle seat and a side seat adjacent to the middle seat, in which the middle and side seats are positioned along a third row of seats within a passenger compartment of the vehicle.

In an example, the vehicle further comprises a cargo area disposed behind the seat assembly, wherein the cargo area is accessible from a cabin of the vehicle via the latch release mechanism of the seat assembly. Here, the given seat may further include a secondary actuator along a rear of the given seat, in which the secondary actuator is accessible from a cargo area in order to fold down the given seat.

BRIEF DESCRIPTION OF THE DRAWINGS

FIGS. 4A-B illustrate example views of interior sections of a vehicle in accordance with aspects of the technology.

FIGS. 6A-E illustrate an example second row side seat configuration in accordance with aspects of the technology.

FIGS. 7A-F illustrate an example middle seat configuration in accordance with aspects of the technology.

DETAILED DESCRIPTION

For passengers riding in a self-driving vehicle, it may be important for a variety of reasons including safety, to prevent them from folding down the seats during the ride. The rear seats, middle seat and/or armrest section may be folded down to provide access to the trunk or other cargo space, but this may be undesirable in many self-driving situations. In one example, it may be possible to access the cargo space by actuating a latching mechanism, which may be positioned on a side or back of the seat or armrest, next to the door, or in some other location. According to aspects of the technology, a latching mechanism release blocker is provided that includes a cover member that prevents access to the latching mechanism.

Example Vehicle Systems

Figure 1A:
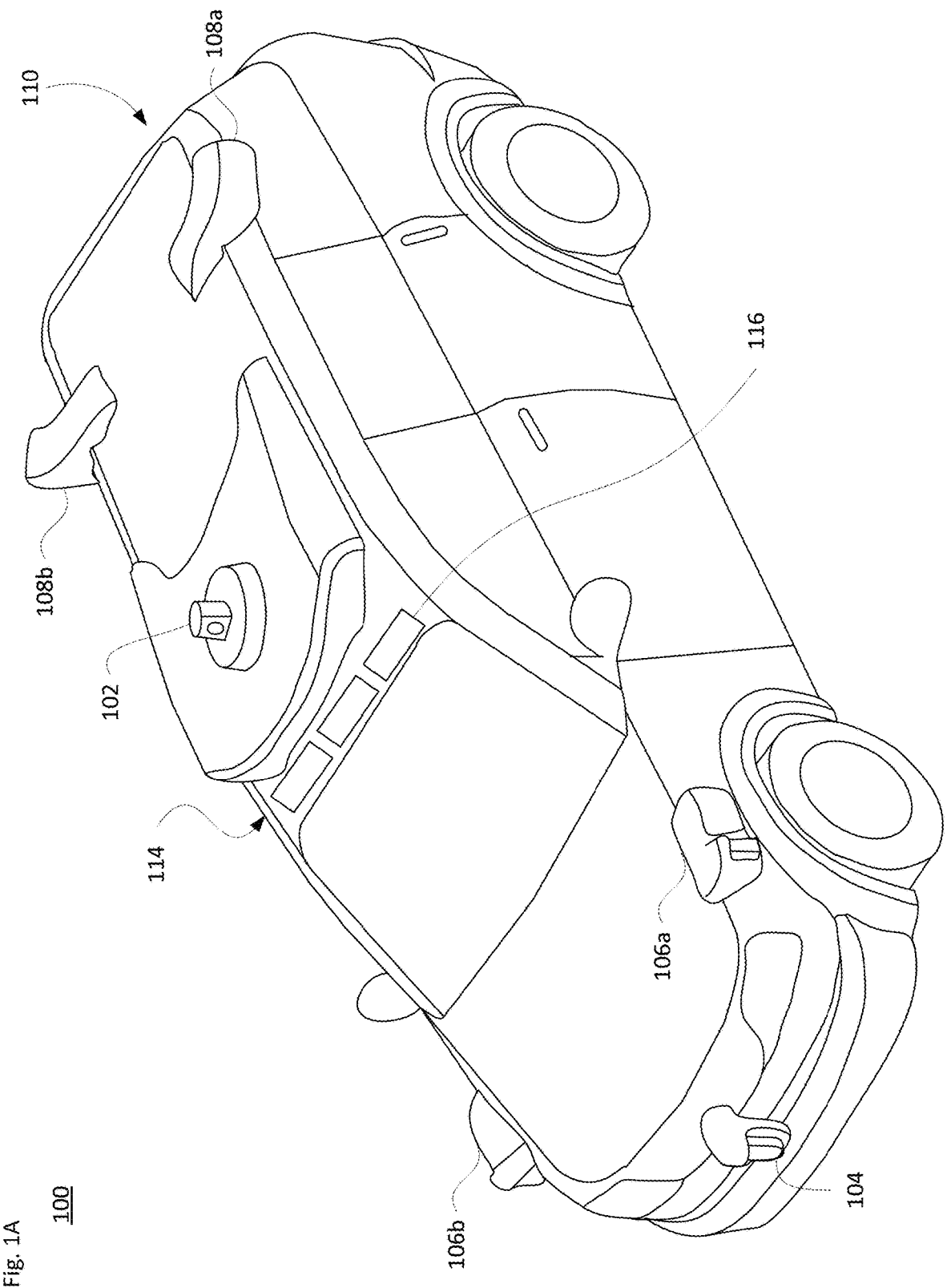
FIGS. 1A-B illustrate an example passenger-type vehicle configured for use with aspects of the technology.
Figure 1B:
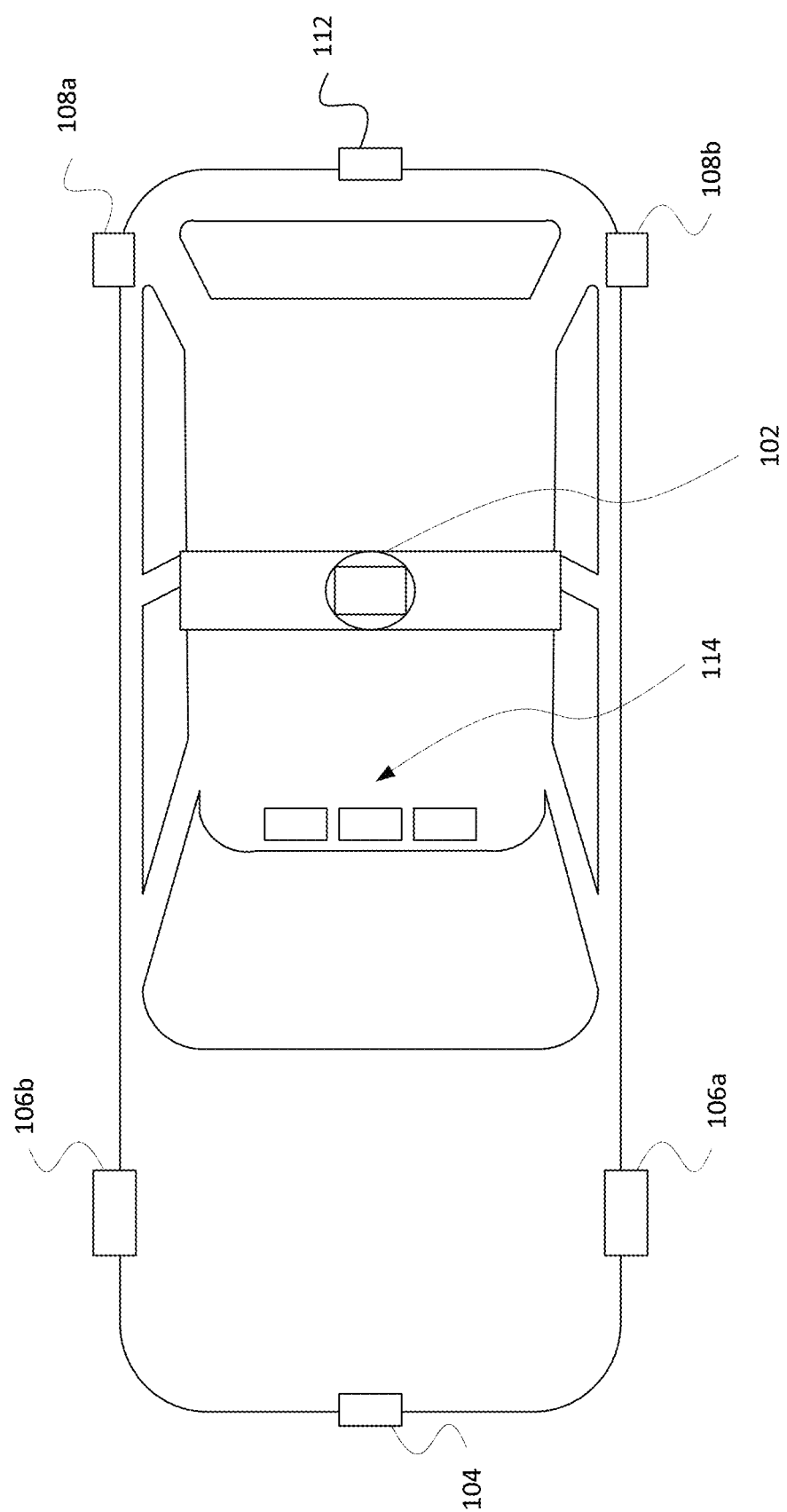

FIG. 1A illustrates a perspective view of an example passenger vehicle 100, such as a minivan, sport utility vehicle (SUV) or other vehicle. FIG. 1B illustrates a top-down view of the passenger vehicle 100. As shown, the passenger vehicle 100 includes various external sensors for obtaining information about the vehicle's outside environment, which enable the vehicle to operate in an autonomous driving mode. For instance, a roof-top housing 102 may include a lidar sensor as well as various cameras, radar units, infrared and/or acoustical sensors. Housing 104, located at the front end of vehicle 100, and housings 106a, 106b on the driver's and passenger's sides of the vehicle, may each incorporate lidar, radar, camera and/or other sensors. For example, housing 106a may be located in front of the driver's side door along a quarter panel of the vehicle. As shown, the passenger vehicle 100 also includes housings 108a, 108b for radar units, lidar and/or cameras also located towards the rear roof portion of the vehicle. Additional lidar, radar units and/or cameras (not shown) may be located at other places along the vehicle 100. For instance, arrow 110 indicates that a sensor unit (112 in FIG. 1B) may be positioned along the rear of the vehicle 100, such as on or adjacent to the bumper. And arrow 114 indicates a series of sensor units 116 arranged along a forward-facing direction of the vehicle. In some examples, the passenger vehicle 100 also may include various sensors for obtaining information about the vehicle's interior spaces (not shown).

By way of example, each external sensor unit may include one or more sensors, such as lidar, radar, camera (e.g., optical or infrared), acoustical (e.g., microphone or sonar-type sensor), inertial (e.g., accelerometer, gyroscope, etc.) or other sensors (e.g., positioning sensors such as GPS sensors). While certain aspects of the disclosure may be particularly useful in connection with specific types of vehicles, the vehicle may be any type of vehicle including, but not limited to, cars, trucks, motorcycles, buses, recreational vehicles, etc.

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive fully autonomously without human assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode includes both partial and full autonomy. The lockout arrangement may be particularly suitable for vehicles operating without a driver in Level 4 or Level 5 modes. Here, for instance, passengers may be seated in the back row of the vehicle, and it may be helpful to prevent access to the rear seat latching mechanism.

Figure 2A:
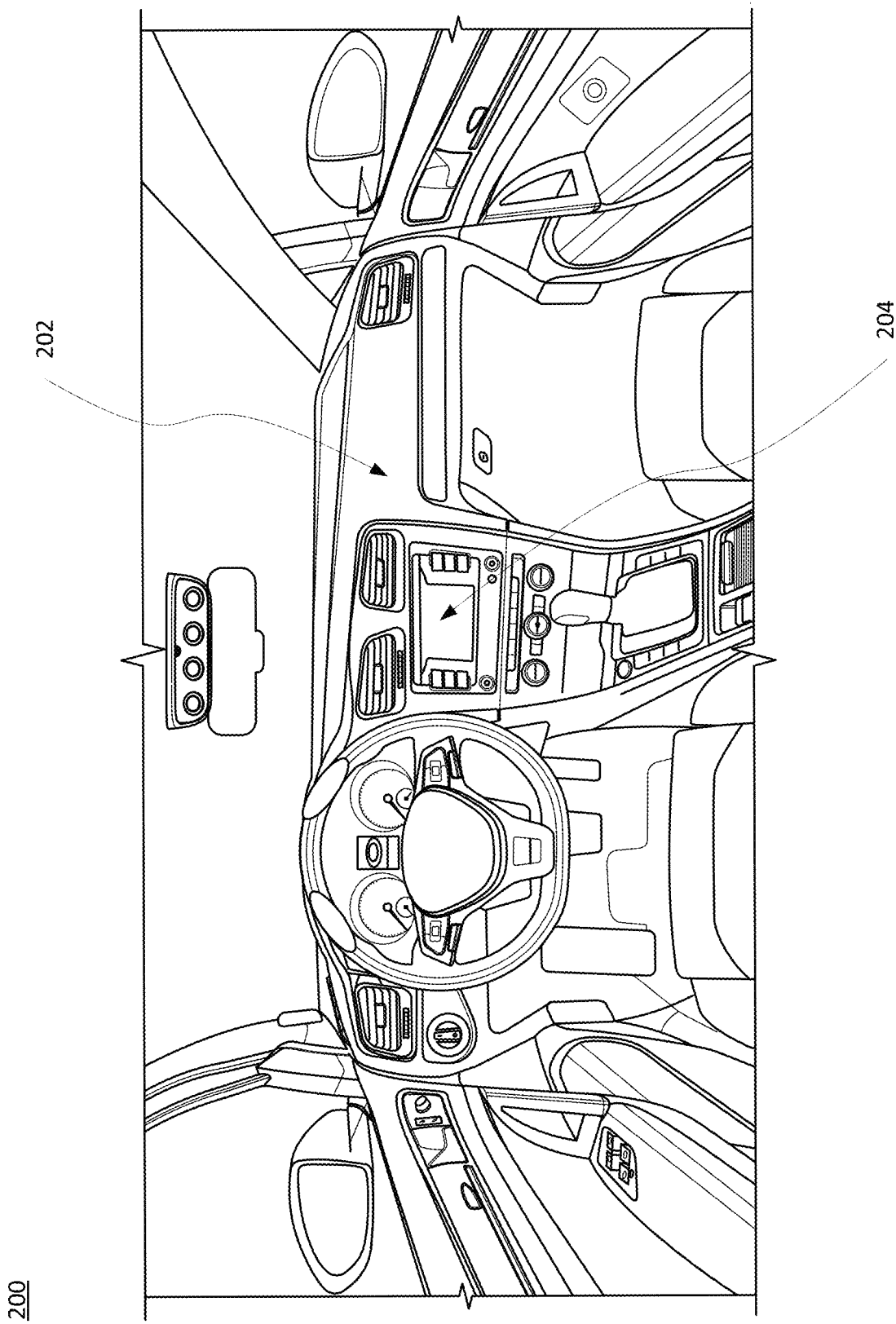
FIGS. 2A-C illustrate interior views of a vehicle in accordance with aspects of the technology.

Turning to FIG. 2A, this figure illustrates an example view 200 within the cabin of the vehicle 100, for instance as seen from the front seats. In this view, a dashboard or console area 202 which includes an internal electronic display 204 is visible. Although vehicle 100 includes a steering wheel, gas (acceleration) pedal, or brake (deceleration) pedal which would allow for a semiautonomous or manual driving mode where a passenger would directly control the steering, acceleration and/or deceleration of the vehicle via the drivetrain, these inputs are not necessary for a fully autonomous driving mode. Rather, passenger input may be provided by interaction with the vehicle's user interface system and/or a wireless network connection for an app on the passenger's mobile phone or other personal computing device. By way of example, the internal electronic display 204 may include a touch screen or other user input device for entering information by a passenger such as a destination, etc. Alternatively, internal electronic display 204 may merely provide information to the passenger(s) and need not include a touch screen or other interface for user input.

Figure 2B:
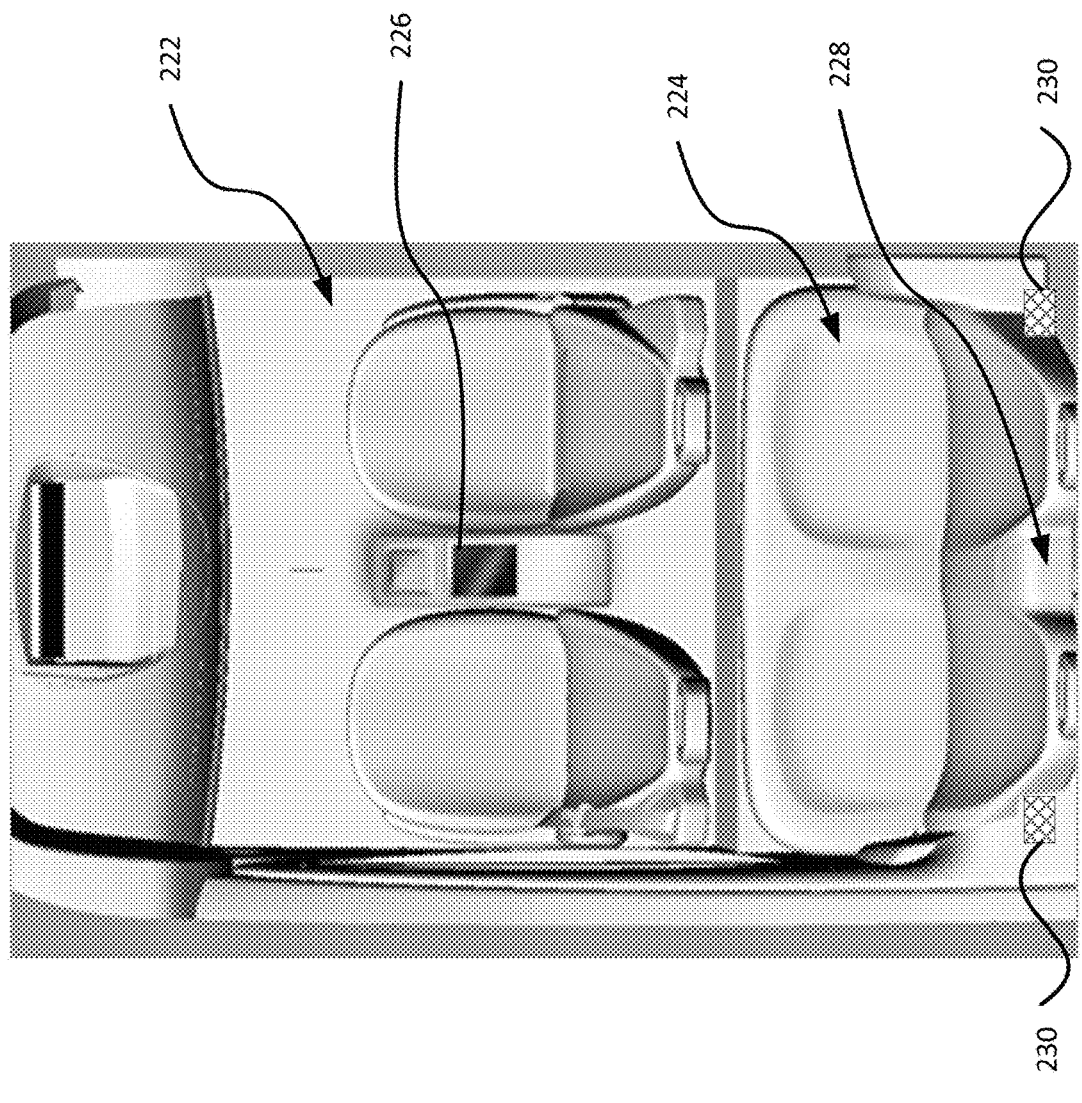
Figure 2C:
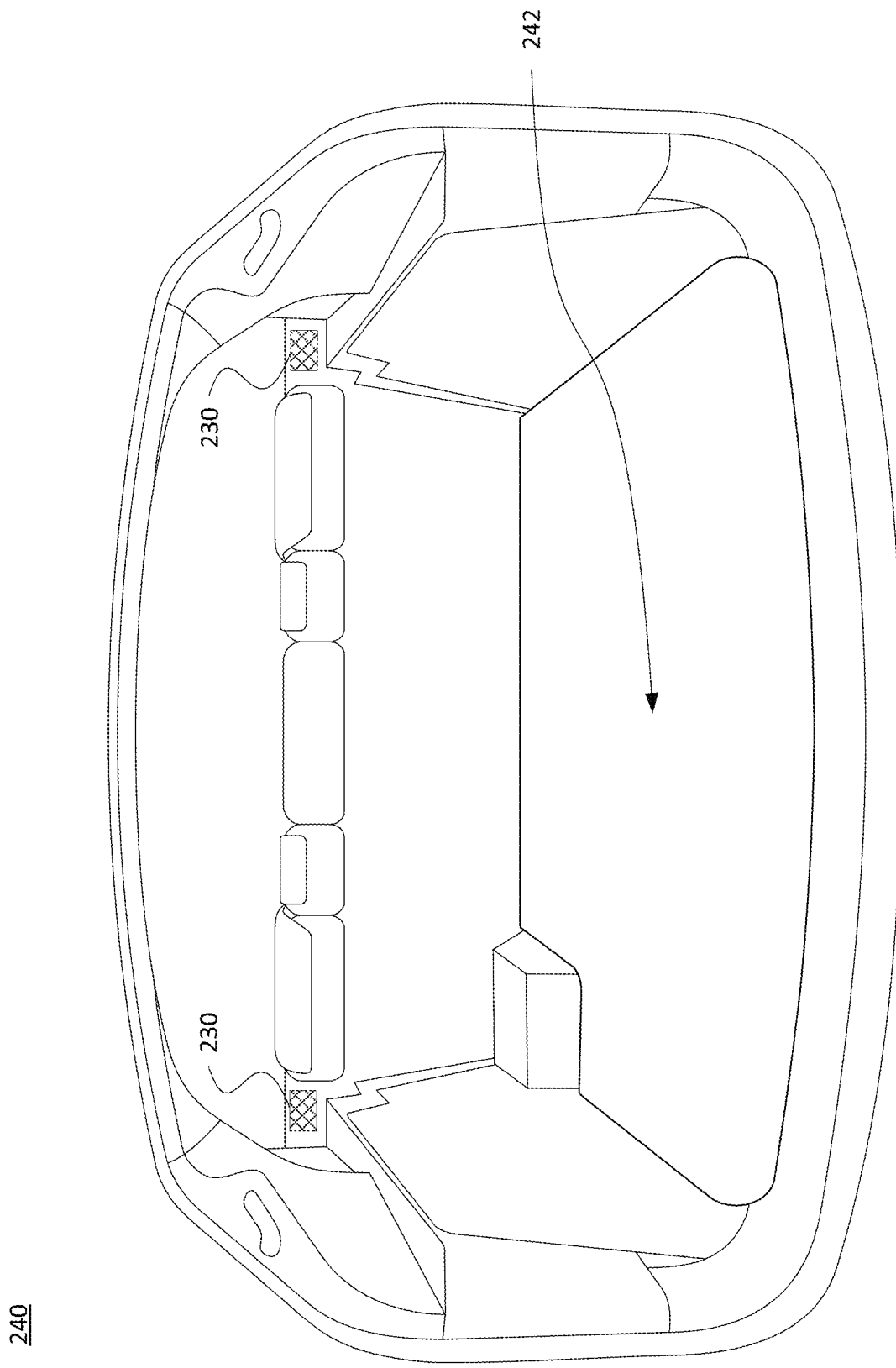

FIG. 2B illustrates a birds-eye top-down view 220 of the vehicle cabin. As shown in this view, the cabin includes a front seat area 222 and a rear seat area 224. A center console 226 may be disposed between the front seats, and a middle section 228 may be disposed between the left and right rear seats of the rear seat area 224. Alternatively, this middle section may include an armrest member. One or more latching mechanisms 230 may be positioned on or near the rear seat area 224, in order to fold down one side or the entire rear seat, or just the middle section or armrest member. FIG. 2C illustrates a perspective view 240 of a trunk region or other cargo space 242 of the vehicle, facing towards the front of the vehicle. As shown, the latching mechanism(s) 230 may be located along a side of the rear seat, for instance adjacent to a door of the vehicle. Alternatively, a latching mechanism 230 may be located along a seat, such as on a side or top of the seat (e.g., at least partly covered by a headrest). Actuating the latching mechanism 230 and folding down the rear seat(s) or armrest member provides access to the trunk region 242. This may be undesirable in a self-driving mode, for instance to promote passenger safety or to limit access to components of the self-driving system that may be located in this area of the vehicle.

Figure 3:
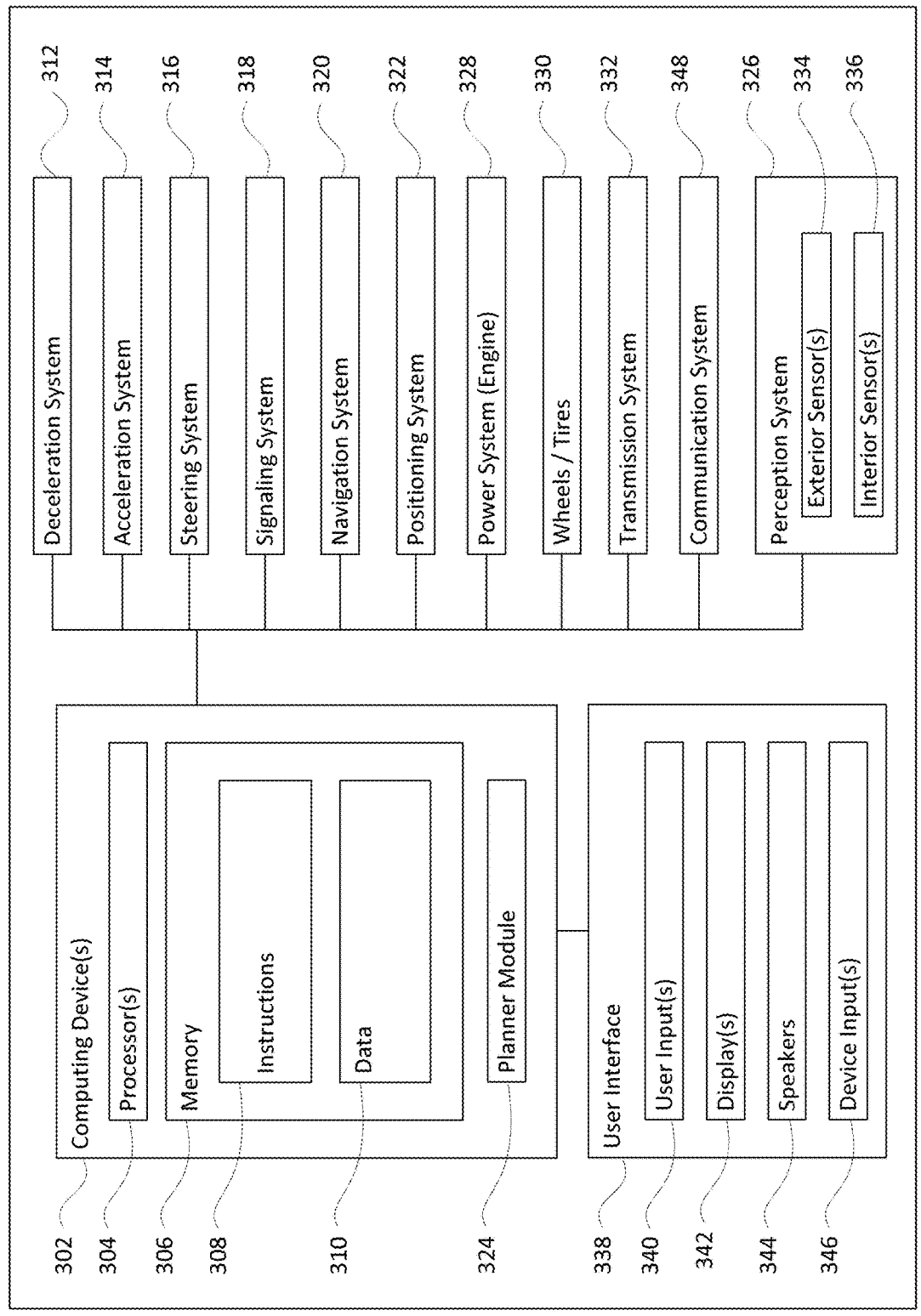
FIG. 3 is a block diagram of systems of an example vehicle in accordance with aspects of the technology.

FIG. 3 illustrates a block diagram 300 with various components and systems of an exemplary vehicle, such as passenger vehicle 100, to operate in an autonomous driving mode. As shown, the block diagram 300 includes one or more computing devices 302, such as computing devices containing one or more processors 304, memory 306 and other components typically present in general purpose computing devices. The memory 306 stores information accessible by the one or more processors 304, including instructions 308 and data 310 that may be executed or otherwise used by the processor(s) 304. The computing system may control overall operation of the vehicle when operating in an autonomous driving mode.

The memory 306 stores information accessible by the processors 304, including instructions 308 and data 310 that may be executed or otherwise used by the processors 304. The memory 306 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 308 may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 310 may be retrieved, stored or modified by one or more processors 304 in accordance with the instructions 308. In one example, some or all of the memory 306 may be an event data recorder or other secure data storage system configured to store vehicle diagnostics and/or obtained sensor data, which may be on board the vehicle or remote, depending on the implementation.

The processors 304 may be any conventional processors, such as commercially available CPUs. Alternatively, each processor may be a dedicated device such as an ASIC or other hardware-based processor. Although FIG. 3 functionally illustrates the processors, memory, and other elements of computing devices 302 as being within the same block, such devices may actually include multiple processors, computing devices, or memories that may or may not be stored within the same physical housing. Similarly, the memory 306 may be a hard drive or other storage media located in a housing different from that of the processor(s) 304. Accordingly, references to a processor or computing device will be understood to include references to a collection of processors or computing devices or memories that may or may not operate in parallel.

In one example, the computing devices 302 may form an autonomous driving computing system incorporated into vehicle 100. The autonomous driving computing system is configured to communicate with various components of the vehicle. For example, the computing devices 302 may be in communication with various systems of the vehicle, including a driving system including a deceleration system 312 (for controlling braking of the vehicle), acceleration system 314 (for controlling acceleration of the vehicle), steering system 316 (for controlling the orientation of the wheels and direction of the vehicle), signaling system 318 (for controlling turn signals), navigation system 320 (for navigating the vehicle to a location or around objects) and a positioning system 322 (for determining the position of the vehicle, e.g., including the vehicle's pose). The autonomous driving computing system may employ a planner module 324, in accordance with the navigation system 320, the positioning system 322 and/or other components of the system, e.g., for determining a route from a starting point to a destination or for making modifications to various driving aspects in view of current or expected traction conditions.

The computing devices 302 are also operatively coupled to a perception system 326 (for detecting objects in the vehicle's internal and external environments), a power system 328 (for example, a battery and/or gas or diesel powered engine) and a transmission system 332 in order to control the movement, speed, etc., of the vehicle in accordance with the instructions 308 of memory 306 in an autonomous driving mode which does not require or need continuous or periodic input from a passenger of the vehicle. Some or all of the wheels/tires 330 are coupled to the transmission system 332, and the computing devices 32 may be able to receive information about tire pressure, balance and other factors that may impact driving in an autonomous mode.

The computing devices 302 may control the direction and speed of the vehicle, e.g., via the planner module 324, by controlling various components. By way of example, computing devices 302 may navigate the vehicle to a destination location completely autonomously using data from the map information and navigation system 320. Computing devices 302 may use the positioning system 322 to determine the vehicle's location and the perception system 326 to detect and respond to objects when needed to reach the location safely. In order to do so, computing devices 302 may cause the vehicle to accelerate (e.g., by increasing fuel or other energy provided to the engine by acceleration system 314), decelerate (e.g., by decreasing the fuel supplied to the engine, changing gears, and/or by applying brakes by deceleration system 312), change direction (e.g., by turning the front or other wheels of vehicle 100 by steering system 316), and signal such changes (e.g., by lighting turn signals of signaling system 318). Thus, the acceleration system 314 and deceleration system 312 may be a part of a drivetrain or other type of transmission system 332 that includes various components between an engine of the vehicle and the wheels of the vehicle. Again, by controlling these systems, computing devices 302 may also control the transmission system 332 of the vehicle in order to maneuver the vehicle autonomously.

Navigation system 320 may be used by computing devices 302 in order to determine and follow a route to a location. In this regard, the navigation system 320 and/or memory 306 may store map information, e.g., highly detailed maps that computing devices 302 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

By way of example only, the perception system 326 may include one or more light detection and ranging (lidar) sensors, radar units, cameras (e.g., optical and/or IR imaging devices, with or without a neutral-density filter (ND) filter), positioning sensors (e.g., gyroscopes, accelerometers and/or other inertial components), acoustical sensors (e.g., microphones or sonar transducers), and/or any other detection devices.

As shown in FIG. 3, the perception system 326 includes one or more external sensors 334 for detecting objects external to the vehicle. The sensors 334 are located in one or more sensor units around the vehicle. The detected objects may be other vehicles, obstacles in the roadway, traffic signals, signs, trees, bicyclists, pedestrians, etc. The sensors 334 may also detect certain aspects of weather or other environmental conditions, such as snow, rain or water spray, or puddles, ice or other materials on the roadway.

The perception system 326 also includes other sensors 336 within the vehicle to detect objects and conditions within the vehicle, such as in the passenger compartment and trunk region. For instance, such sensors may detect, e.g., one or more persons, pets, packages, etc., as well as conditions within and/or outside the vehicle such as temperature, humidity, etc. This can include detecting where the passenger(s) is sitting within the vehicle (e.g., front passenger seat versus second or third row seat, left side of the vehicle versus the right side, etc.). It could also include detecting whether a latching mechanism has been engaged, or whether a seat or armrest member has been partially or fully folded down.

The raw data obtained by the sensors can be processed by the perception system 336 and/or sent for further processing to the computing devices 302 periodically or continuously as the data is generated by the perception system 336. Computing devices 302 may use the positioning system 322 to determine the vehicle's location and perception system 326 to detect and respond to objects when needed to reach the location safely, e.g., via adjustments made by planner module 324. In addition, the computing devices 302 may perform calibration of individual sensors, all sensors in a particular sensor assembly, or between sensors in different sensor assemblies or other physical housings.

Computing devices 302 may include all of the components normally used in connection with a computing device such as the processor and memory described above as well as a user interface subsystem 338. The user interface subsystem 338 may include one or more user inputs 340 (e.g., a mouse, keyboard, touch screen and/or microphone) and one or more display devices 342 (e.g., a monitor having a screen or any other electrical device that is operable to display information). In this regard, an internal electronic display may be located within a cabin of the vehicle (e.g., 204 in FIG. 2A) and may be used by computing devices 302 to provide information to passengers within the vehicle. By way of example, displays may be located, e.g., along the dashboard, on the rear of the front row of seats, on a center console between the front row seats, along the doors of the vehicle, extending from an armrest, etc. Other output devices, such as speaker(s) 344 may also be located within the passenger vehicle. The passenger(s) may communicate directly with the vehicle via one or more device inputs 346. The inputs 346 may include a touch screen on an internal electronic display, a microphone for receiving spoken instructions, a haptic sensor for receiving physical feedback, etc.

The vehicle also includes a communication system 348. For instance, the communication system 348 may also include one or more wireless configurations to facilitate communication with other computing devices, such as passenger computing devices within the vehicle, computing devices external to the vehicle such as in another nearby vehicle on the roadway, and/or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. The communication system 348 may thus include one or more antennas located within the cabin and/or on the vehicle's roof, as well as one or more transceiver modules coupled to the antennas for providing wireless communication.

While the components and systems of FIG. 3 are generally described in relation to a passenger vehicle arrangement, as noted above the technology may be employed with other types of vehicles, such as buses, campers, cargo vehicles, etc.

Example Implementations

In view of the structures and configurations described above and illustrated in the figures, various aspects will now be described in accordance with aspects of the technology.

A self-driving vehicle, such as a vehicle with level 4 or level 5 autonomy that can perform driving actions without human operation, has unique requirements and capabilities. This includes making driving decisions based on a planned route, received traffic information, and objects in the external environment detected by the onboard sensors. It also includes determining a status of the vehicle before picking up a passenger, while transporting the passenger to his or her destination, and after the passenger exists the vehicle. In such situations, it may be beneficial to prevent passengers from folding down the rear seats or armrest member, for instance for passenger safety or to limit access to certain onboard systems that may be located in the trunk or other storage area.

Figure 4B:
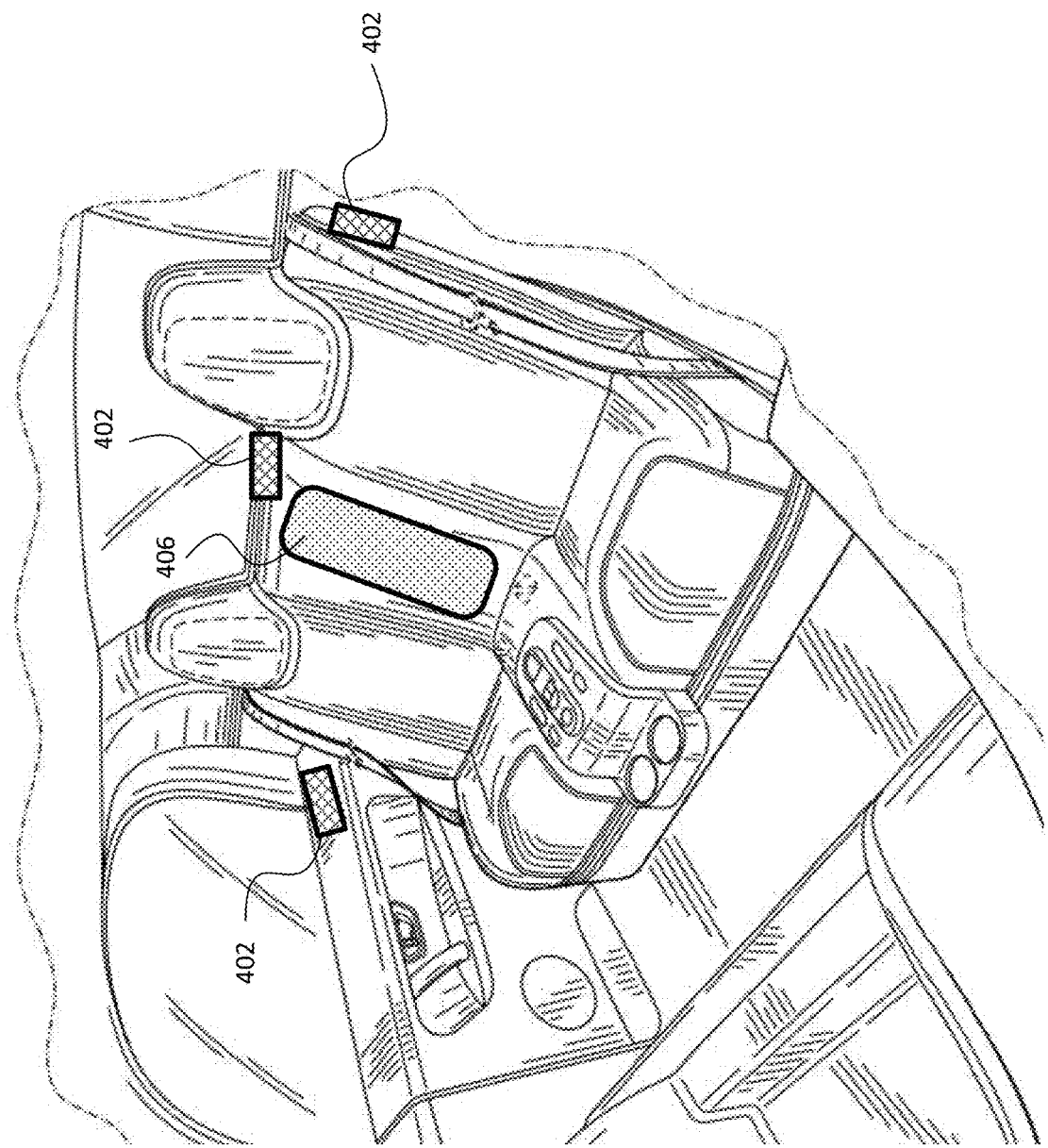

FIGS. 4A-B illustrates views 400 and 410, respectively, of the rear seat area of a passenger vehicle such as vehicle 100 of FIGS. 1A-B. One or more latching mechanism receptacles 402 may be provided in order to fold down the left/right rear seat(s) 404 or middle seat 406, which may include an armrest member therein. For instance, a latching mechanism receptacle 402 may be located on or adjacent to the seat itself, on the door next to the seat, adjacent to the armrest member, etc. The latching mechanism receptacle receives a latch mechanism such as a latch, clasp, handle, button or other actuator designed to allow the seat(s) or armrest member to fold down. Actuating the latch mechanism may enable the user to fold down one individual seat or the entire rear seat back, or just the armrest member. This can enable splitting of the rear seats, such as to provide a 60/40 fold-down option (e.g., 60/40 left/right or 40/60 left right) or a 80/20 fold-down option (e.g., where 20% corresponds to the middle seat section).

Figure 5A:
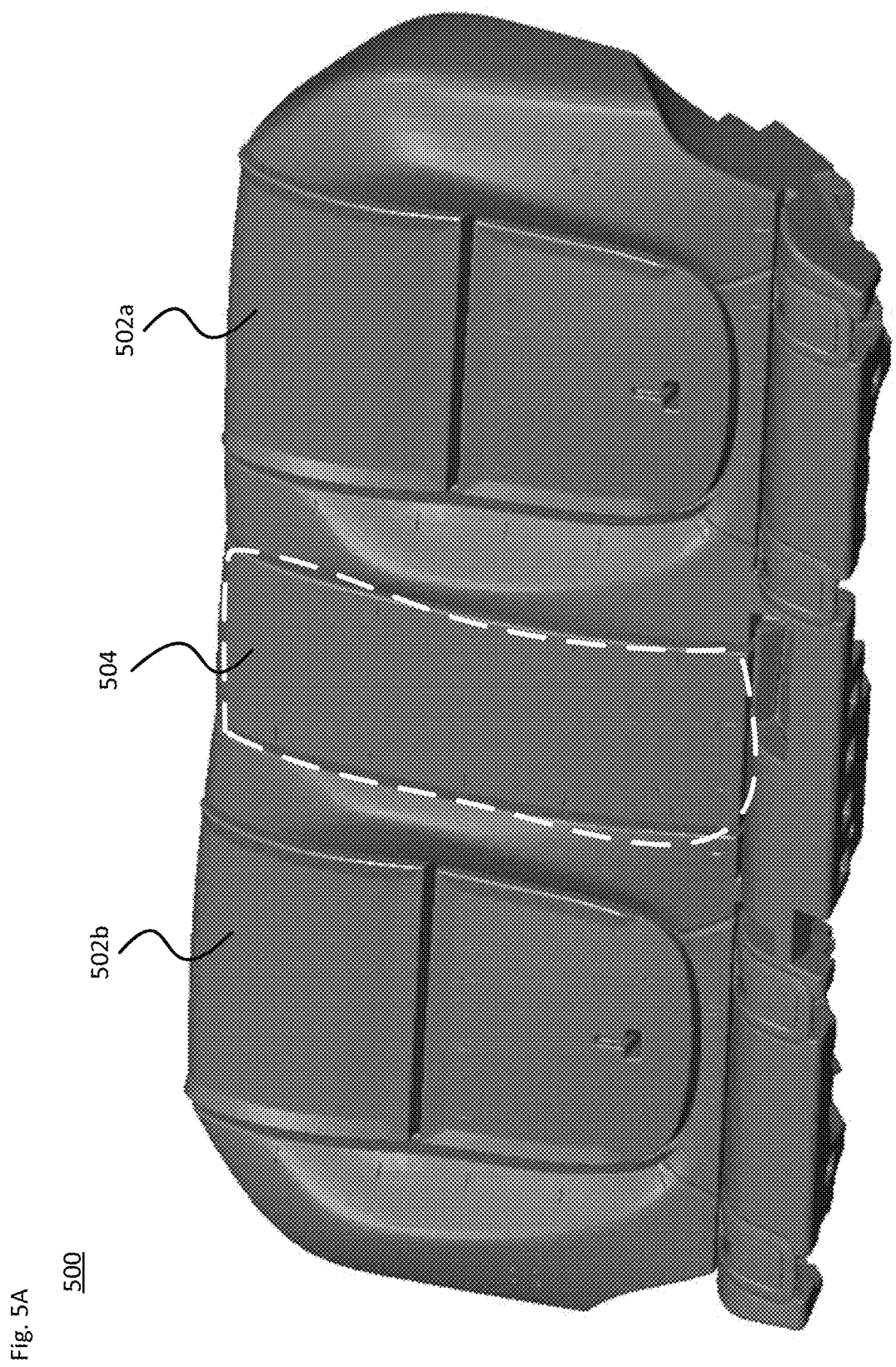
FIGS. 5A-B illustrate an example of a second row seat configuration in accordance with aspects of the technology.
Figure 5B:
Figure 6B:
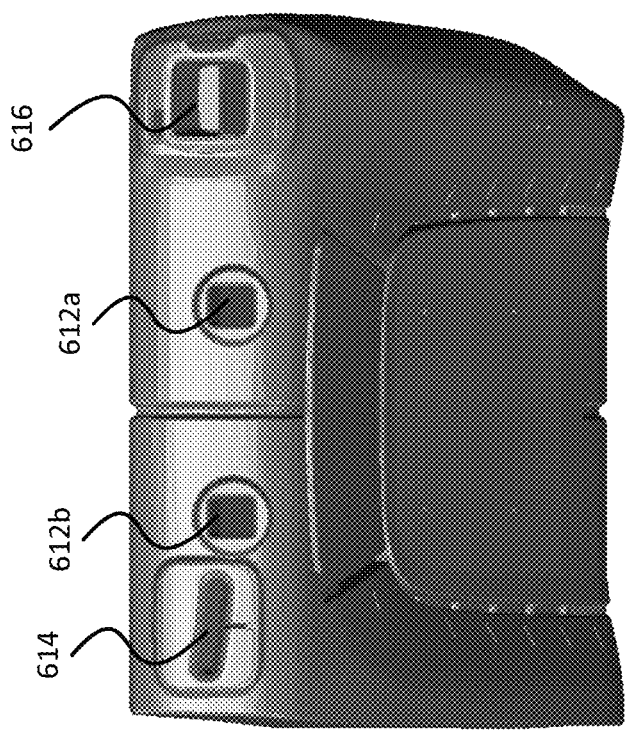
Figure 6A:
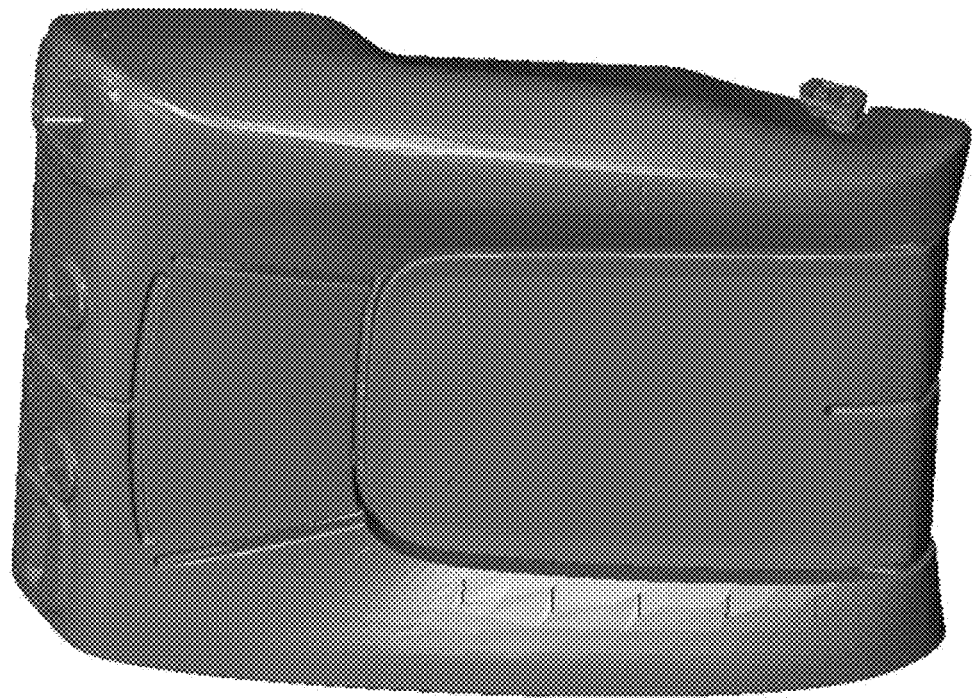

FIG. 5A illustrates an example 500 of the entire rear seat area, including left and right seats 502a and 502b, respectively, and a middle seat section 504, with a dashed line indicating the seatback portion of the middle seat section 504, which may be folded down upon actuation of a latching mechanism. In this example, the headrests for the seats are omitted. FIG. 5B illustrates another example 510 of the entire rear seat area, including the left and right seats 502*a* and 502*b* and middle seat section 504 of FIG. 5A. In this example, headrests 512*a* and 512*b* for the left and right seats, and headrest 514 for the middle seat section are visible.

FIGS. 6A-E illustrate a perspective view 600, a top view 610, a front view 620, a left side view 630 and a right side view 640 of left seat 502 of FIGS. 5A-B. As seen in the top view 610 of FIG. 6B, the top section of the seat includes receptacle 612*a,b* for a headrest (omitted), a seatbelt receptacle 614 (e.g., to buckle a passenger in the middle seat), and a latching mechanism 616 (e.g., to fold down the left rear seat). As shown in view 640 of FIG. 6E, this seat may include a coupling element 642 for securing the middle seat thereto. The coupling element 642 may be, for instance, a latch, hasp, clasp, receptacle to receive a locking element of the middle seat, etc. While not illustrated separately, the right rear seat may be configured similarly to or as a mirror image of the left rear seat. For instance, the top of the right seat may include the headrest receptacles and the latching mechanism, but may not include a seatbelt receptacle for the middle seat because it is arranged on the left seat.

Figure 7F:
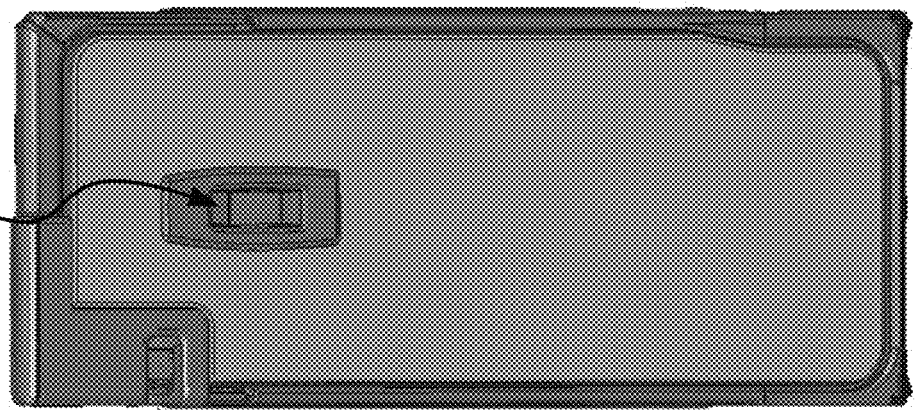
Figure 7E:
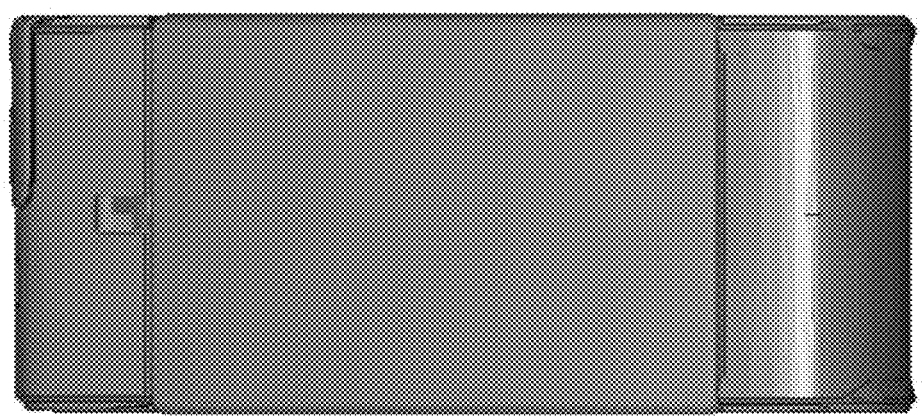
Figure 7D:
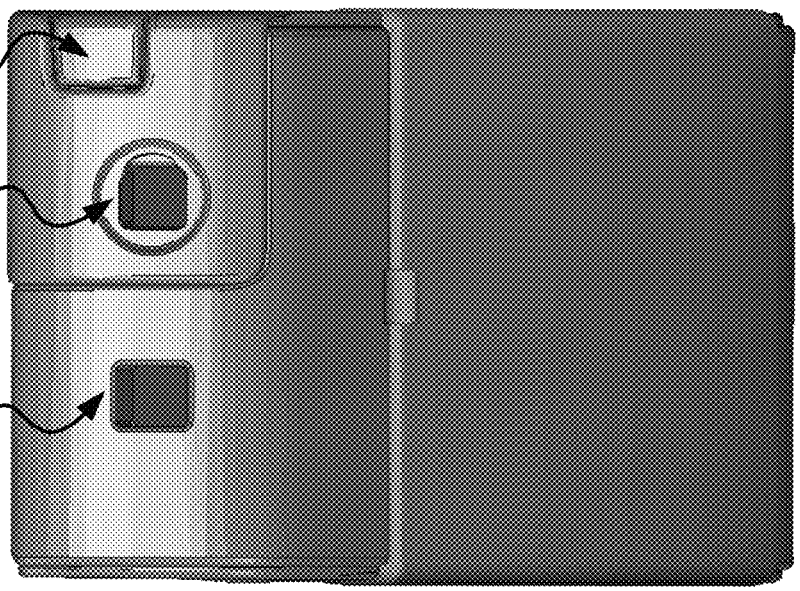

FIGS. 7A-F illustrate an example of a middle seat of FIGS. 5A-B. In particular, FIG. 7A illustrates a perspective view 700, FIG. 7B illustrates a left side view 710, FIG. 7C illustrates a right side view 720, FIG. 7D illustrates a top view 730, FIG. 7E illustrates a front view 740, and FIG. 7F illustrates a rear view 750. As shown, the middle seat includes receptacles 702*a, b* for a headrest (omitted). It also includes a latching mechanism including an actuator 704 and a release element 706. The release element 706 may be, for instance, a latch, hasp, clasp, receptacle or other connection element to secure the middle seat in a full upright position, or, when released via actuation by the actuator, allows a passenger or other person to fold down the middle seat (e.g., in an 80/20 split with the left and right seats not folded down). In one scenario, the release element 706 is mechanically engaged with the coupling element 642 of the left (or right) rear seat. The middle seat may also include an armrest member 708, which is capable of being folded down to provide a place for a passenger's arm, to put a package or laptop on, etc. And as shown by rear view 720, the middle seat may have a child seat anchor element 722 and/or another actuator (not shown) on the back of the seat. An actuator on the back of the seat may enable a user to disengage the release element 706 from the trunk or other cargo space, but is not intended for a passenger in the middle seat to access during a ride.

FIGS. 8A-H illustrate one example of a seat back release blocker 800, which can be used to close off the latching mechanism actuator and prevent a passenger from folding down the middle seat, e.g., in the second or third row of the vehicle's cabin. As shown, the seat back release blocker 800 may be formed as a single, unitary cover member. The cover member may be releasably secured to the seat using one or more screws or other fasteners (not shown).

Figure 8B:
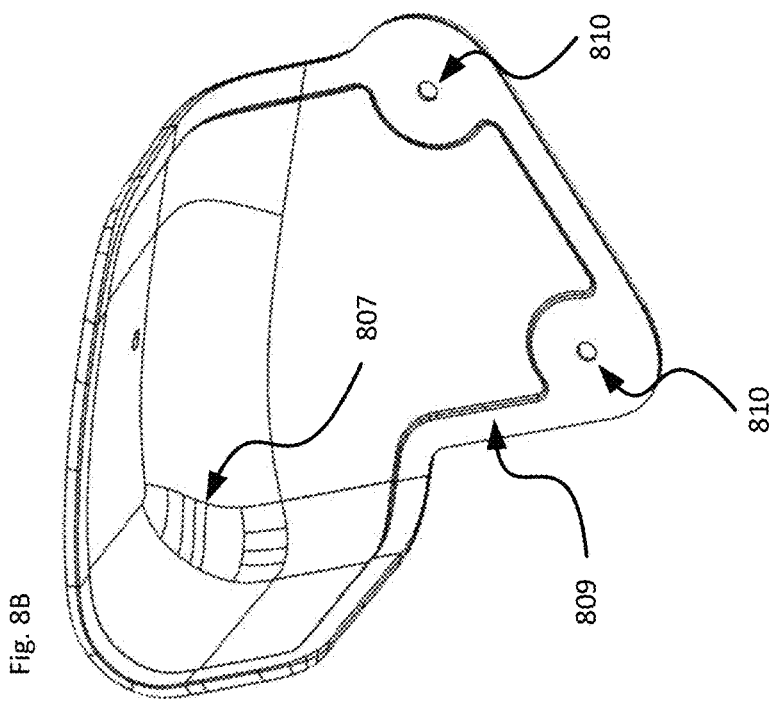
FIGS. 8A-H illustrate an example of a seat back release blocker in accordance with aspects of the technology.
Figure 8A:
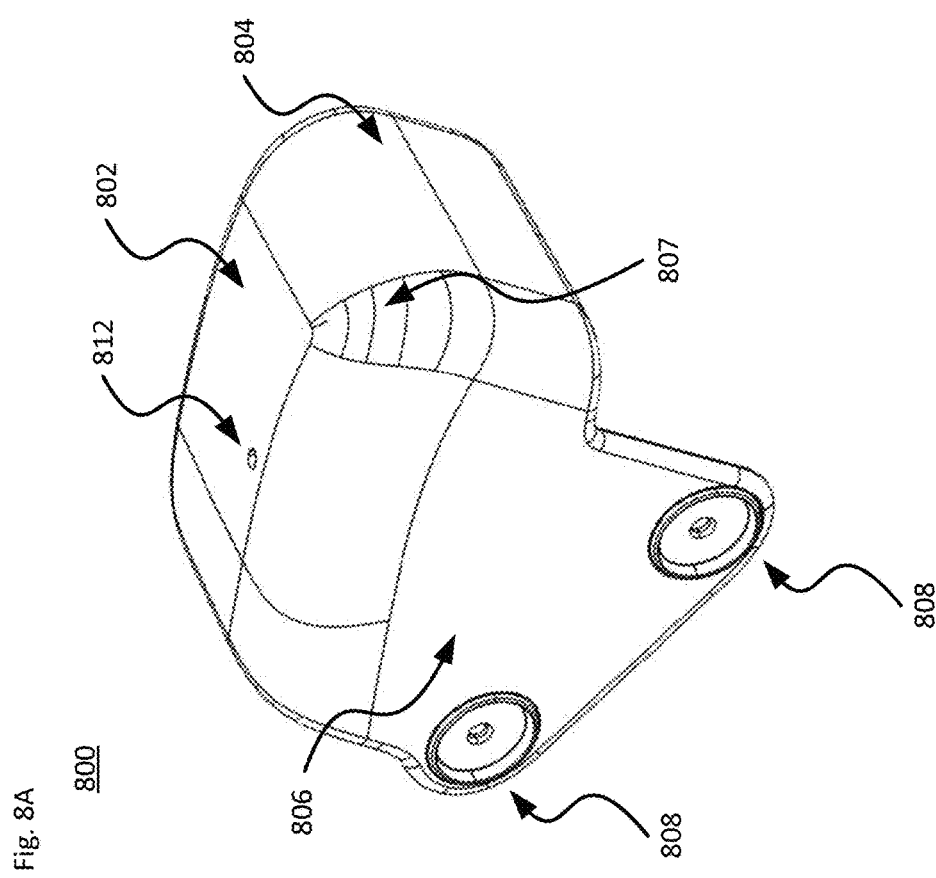
Figure 8D:
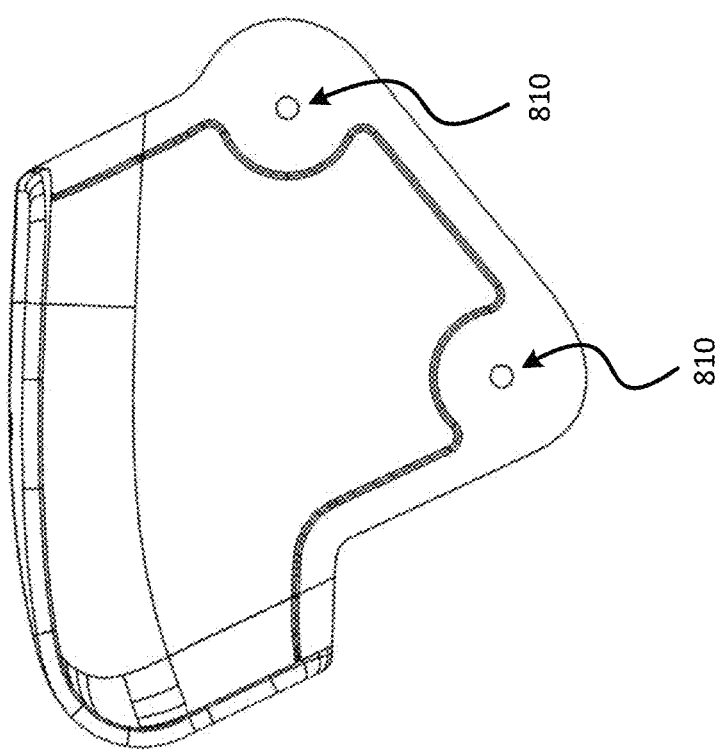
Figure 8C:
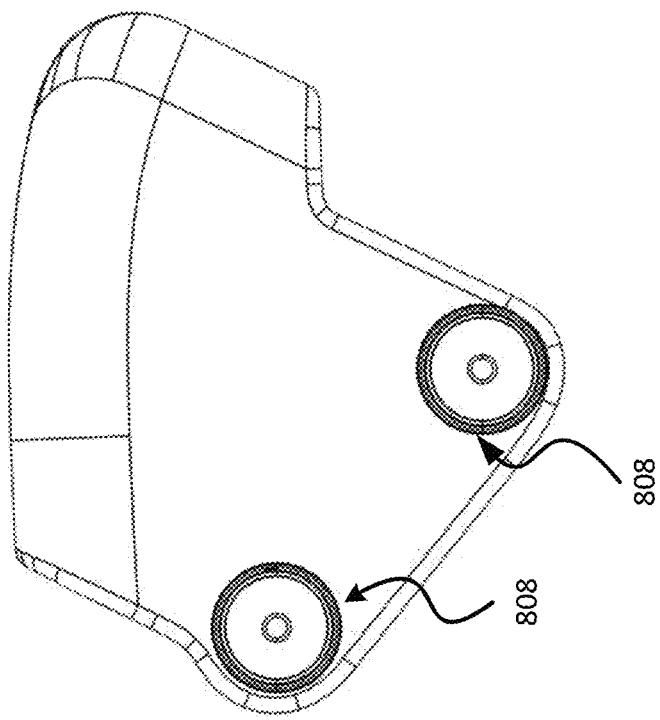
Figure 8F:
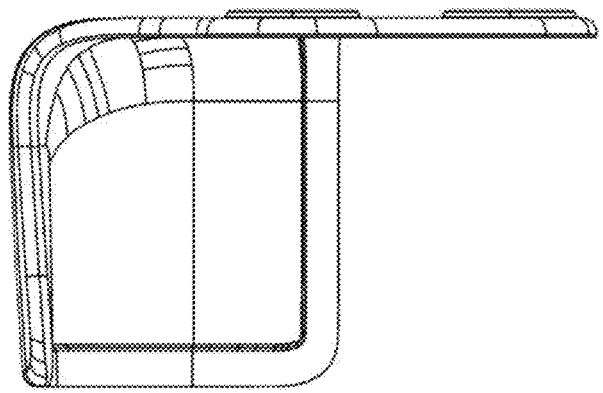
Figure 8H:
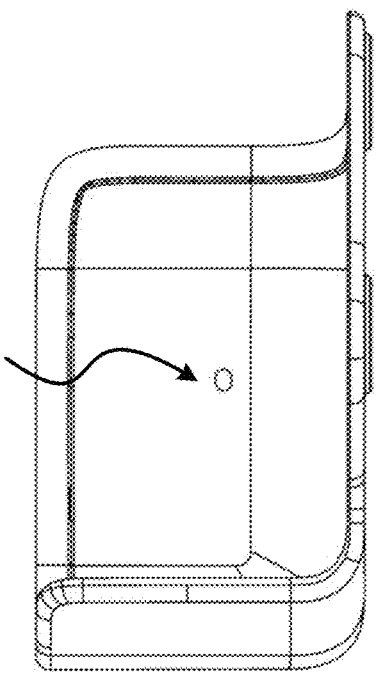
Figure 8E:
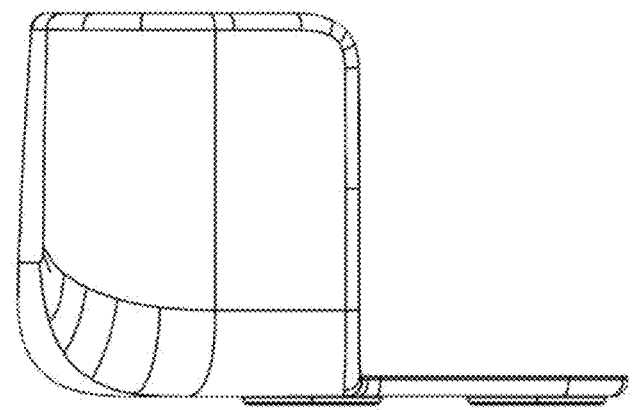
Figure 8G:
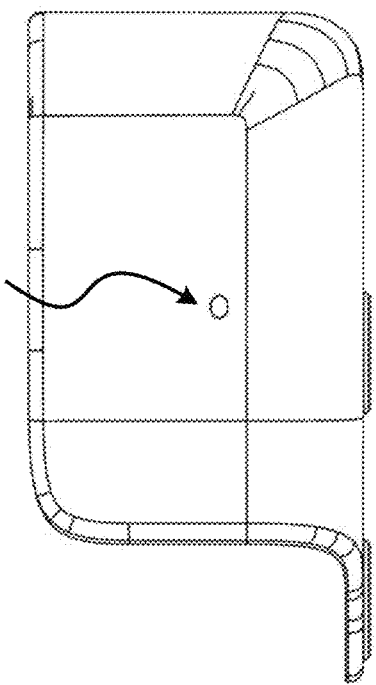

In particular, FIG. 8A illustrates a front perspective view of the blocker and FIG. 8B illustrates a rear perspective view thereof. FIG. 8C is a front view, FIG. 8D is a rear view, FIG. 8E is a right side view, FIG. 8F is a left side view, FIG. 8G is a top view, and FIG. 8H is a bottom view. As seen in FIG. 8A, the cover of the blocker has three side surfaces: top 802, rear 804 and side 806. These surfaces are designed to cover the latching mechanism, such as along a top portion of the middle seat, and to secure the blocker to the middle seat, e.g., by fastening along a side of the middle seat.

The interior region of the cover formed by the surfaces may be arranged to conform to a portion of the exterior of the middle seat, such as along a top corner section of the seat. In one example, the cover consists of all three sides, with no additional sides. In another example, the cover consists essentially of the top 802 and side 806, with some or all of the rear 804 omitted. While the three sides may be generally perpendicular to one another, these sides may converge together along a corner area 807, which may be rounded along the interior and/or exterior thereof. For instance, the interior surface of the corner area may be contoured to conform to a corner of the middle seat. Desirably, each side is continuous and has a generally uniform thickness (e.g., 0.5 mm-10.0 mm, or more or less). The exterior and interior surfaces may be generally planar and smooth. However, as illustrated in the view of FIG. 8B, a small perimeter area 809 along the interior side of the cover may be slightly thicker than the other portions of the cover. By way of example, this additional thickness may be, e.g., 0.2 mm-10.0 mm, or more or less. In the configuration shown, no reinforcement elements (e.g., lateral or transverse cross-members) are used. While shown as being along the perimeter area, the thicker section (if present), may be disposed along the interior surface away from the edge of the cover. The cover may be integrally formed of a plastic, such as polyethylene terephthalate (PETE), high-density polyethylene (HDPE), low-density polyethylene (LDPE), polyvinyl chloride (PVC), polypropylene (PP), nylon or another polyamide, or a combination thereof. It may be fabricated via injection molding, stamping or other fabrication process. Plastic or a similar material may also be able to flex so that the cover conforms to the seat portion over the latching mechanism without gaps.

In the three-sided example configuration of FIGS. 8A-H, while the sides are generally continuous, the side surface 806 includes a pair of receptacles 808, each having an opening 810 therethrough. As shown, the openings 810 are included in the perimeter area 809. The receptacles 808 are configured to each receive a fastener to removably affix the blocker to the middle seat. As shown, each receptacle 808 may include a circular rim. This rim may protrude a short amount (e.g., 0.2 mm-2.0 mm, or more or less) away from the outer surface of the cover. The height of the rim may be selected so that an exposed end of a fastener (e.g., the head of a screw) is below the height of the rim when the fastener is fully engaged.

While two receptacles are illustrated, in other examples one or three or more receptacles may be employed. As best seen in the front perspective view of FIG. 8A and the top and bottom views 8G and 8H, the cover may include an opening 812, which may be a through-hole or slot, which may be circular, oval, rectangular or another shape. The opening 812 is arranged so that a tool can be extended through the top surface of the cover to mechanically engage the actuator, such as actuator 704 discussed above. In one scenario, this configuration enables a technician or other service person to engage the release element 706, thereby providing access to the trunk or other storage area behind the seat. This may be done for maintenance purposes, while the cover remains in place so that passengers are not able to fold down the seat.

Figure 9:
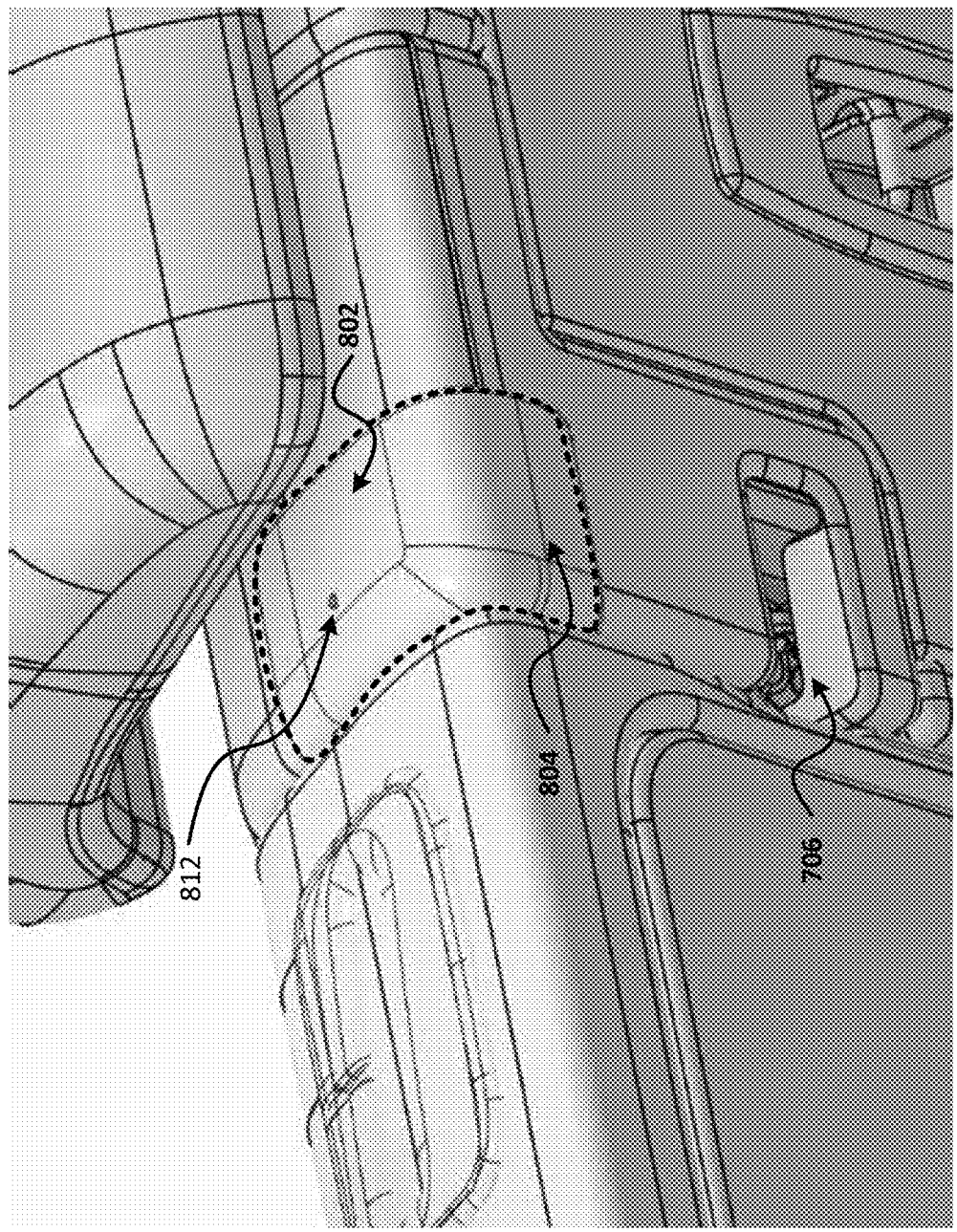
FIG. 9 illustrates a rear perspective view of a seat assembly with a release blocker in accordance with aspects of the technology.
Figure 10:
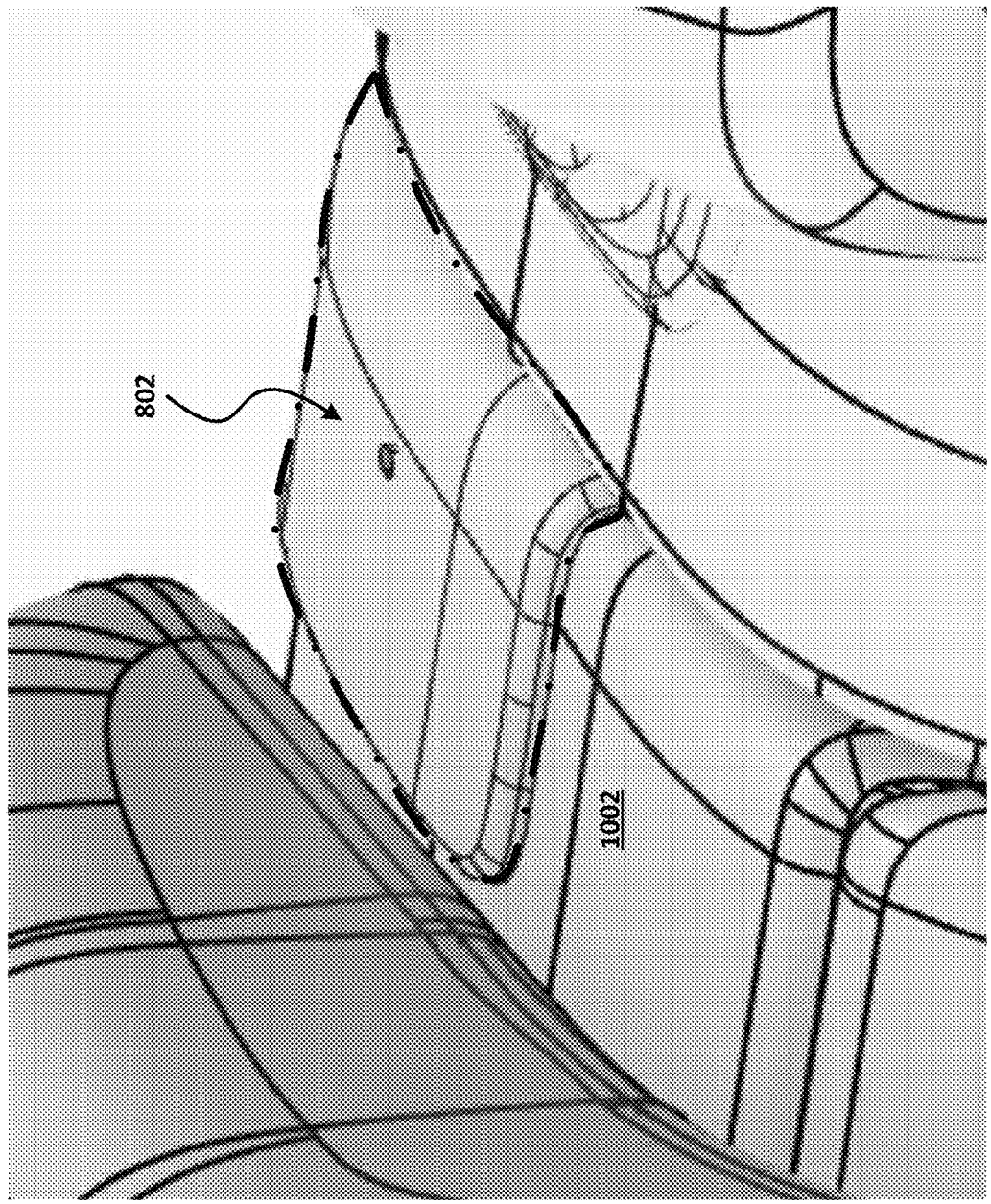
FIG. 10 illustrates a front perspective view of a seat assembly with a release blocker in accordance with aspects of the technology.

FIG. 9 illustrates a rear perspective view 900 in which the seat release blocker is affixed to the middle seat. This rear perspective view illustrates the top surface 802 of the cover (outlined by a dotted line) blocking the actuator, and the rear surface 804 positioned along the top back corner of the middle seat. It also illustrates the release element 706 along the back of the middle seat. Here, it can be seen that the left side seat is flush with the side of the middle seat. Thus, the side surface 806 of the cover, including the receptacles 808 and fasteners), is hidden by the adjacent seat. In this example opening 812 is illustrated along the top surface of the cover. FIG. 10 illustrates a front perspective view 1000, of the example cover (outlined by a dash-dot line). As seen in this view, the top surface 802 of the cover may extend above a top surface 1002 of the middle seat. However, in other examples these top surfaces may be flush, for instance to give a continuous appearance.

Figure 11:
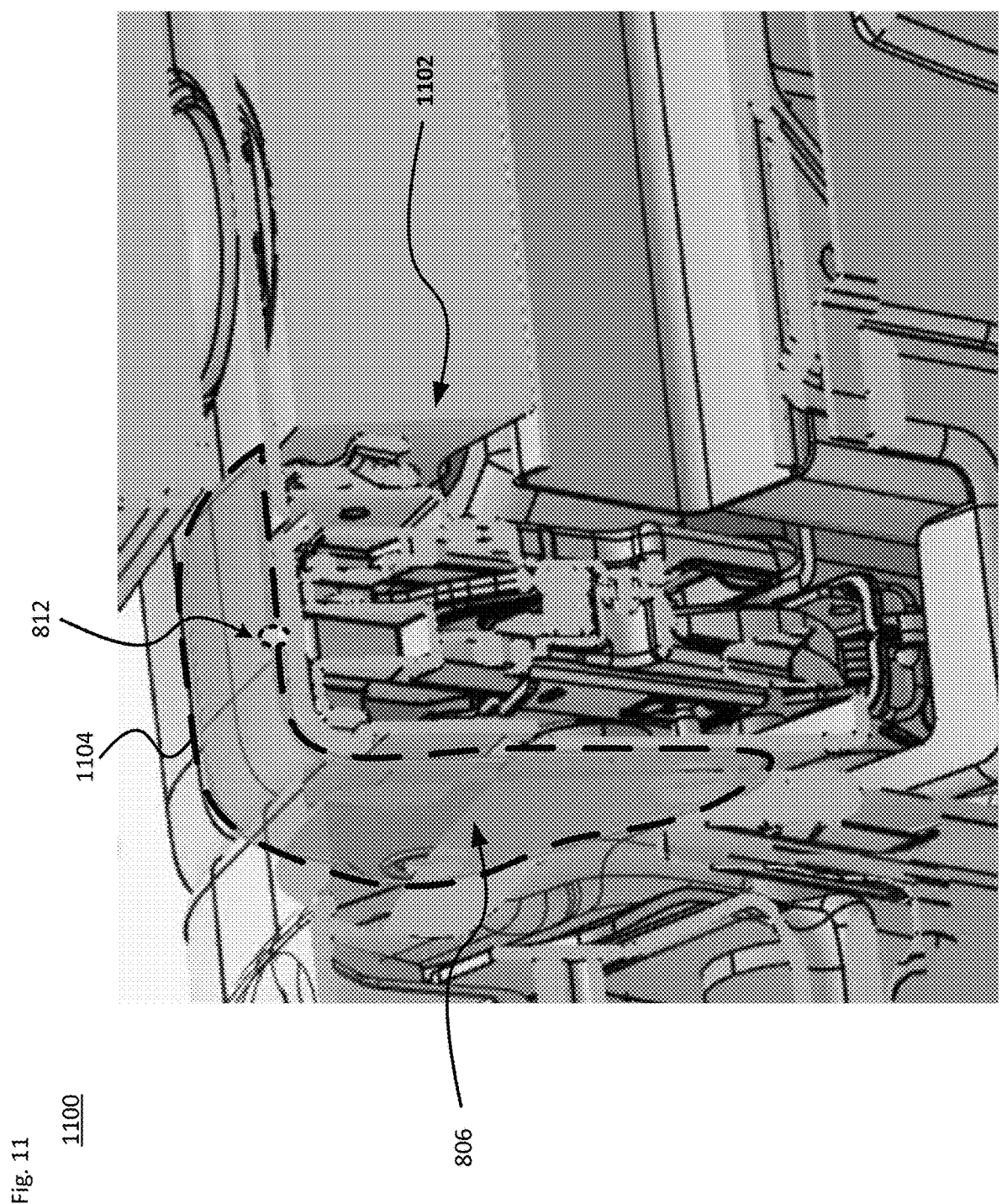
FIG. 11 illustrates a cutaway view of an installed seat back release blocker in accordance with aspects of the technology.

FIG. 11 illustrates an example rear perspective cutaway view 1100 of a middle seat with the seat release blocker affixed. As shown in this cutaway view, the seat includes a latching mechanism section 1102, in which a release element is operated via an actuator. For instance, when operated, the release element disengages from the adjacent seat (e.g., the left side seat) so that the middle seat can be folded down. Dashed region 1104 illustrated the seat release blocker cover disposed over a portion of the middle seat so that the actuator is covered and not accessible by a passenger. In this example, opening 812 provides access to the actuator via a tool (e.g., awl or screwdriver) used by a service technician. In this manner, the middle seat or armrest section of a seat may be prevented from folding down, so that a passenger is not able to access the trunk or other compartment behind the seat. This cutaway view shows the side 806 of the cover, that would otherwise would be hidden by the adjacent seat.

Finally, the technology is applicable for various types of vehicles, including passenger cars, buses, RVs and trucks or other cargo carrying vehicles.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations may be performed in a different order or simultaneously, unless expressly indicated otherwise herein.

The invention claimed is:

1. A seat release blocker for a vehicle configured to operate in an autonomous driving mode, the seat release blocker comprising:
a cover having at least a top surface and a side surface, the top surface being configured to cover an actuator disposed along a seat of the vehicle, the actuator configured to actuate a release element in order to enable the seat of the vehicle to fold down, the side surface being generally perpendicular to the top surface, the side surface having a set of receptacles each having an opening therethrough; and
one or more fasteners operatively coupled to the set of receptacles, the one or more fasteners being configured to secure the cover to the seat of the vehicle;
wherein, when the cover is fixedly secured by the one or more fasteners to the seat of the vehicle, the cover is adapted to prevent passenger access to the actuator so that the seat of the vehicle cannot be folded down.

2. The seat release blocker of claim 1, wherein the cover further includes a rear surface disposed generally perpendicular to the top surface and the side surface.

3. The seat release blocker of claim 2, wherein the top surface includes an opening therethrough, the opening being adapted to receive a tool so that the actuator is actuatable by the tool.

4. The seat release blocker of claim 2, wherein the cover consists essentially of the top surface, side surface and rear surface.

5. The seat release blocker of claim 2, wherein the top surface, side surfaces and rear surfaces come together along a corner area of the cover.

6. The seat release blocker of claim 5, in which an interior surface of the corner area of the cover is contoured to conform to a corner of the seat.

7. The seat release blocker of claim 2, wherein:
a perimeter region of an interior of at least the side surface of the cover is thicker than another region of the interior of at least the side surface; and
the opening for each receptacle of the set of receptacles is disposed along the perimeter region.

8. The seat release blocker of claim 2, wherein the cover is formed of a single, unitary cover member.

9. The seat release blocker of claim 8, wherein the unitary cover member forms a continuous surface therealong other than the set of receptacles and an opening along the top surface, the opening being adapted to receive a tool so that the actuator is actuatable by the tool.

10. The seat release blocker of claim 2, wherein the set of receptacles comprises a pair of receptacles, and each receptacle comprises a circular rim extending away from the side surface.

11. A seat assembly of a vehicle configured to operate in an autonomous driving mode, the seat assembly comprising:
one or more seats configured for use in the vehicle, the one or more seats being foldable from an upright position to a folded position upon engagement of a latch release mechanism; and
the seat release blocker of claim 1;
wherein the cover of the seat release blocker is fixedly secured by the one or more fasteners to a given one of the one or more seats of the vehicle, the cover preventing passenger access to the latch release mechanism in order to prevent the given seat of the vehicle from being folded down.

12. The seat assembly of claim 11, wherein the one or more seats includes a middle seat and a side seat adjacent to the middle seat.

13. The seat assembly of claim 12, wherein the cover is fixedly secured to the middle seat.

14. The seat assembly of claim 13, wherein:
the cover further includes a rear surface disposed generally perpendicular to the top surface and the side surface;
the top, side and rear surfaces come together along a corner area of the cover; and
an interior surface of the corner area of the cover is contoured to conform to a corner of the middle seat.

15. The seat assembly of claim 13, wherein a side of the side seat covers the side surface of the seat release blocker.

16. A vehicle configured to operate in an autonomous driving mode, the vehicle including:
the seat assembly of claim 11; and a driving system configured to operate the vehicle in the autonomous driving mode.

17. The vehicle of claim 16, wherein the one or more seats includes a middle seat and a side seat adjacent to the middle seat, the middle and side seats being positioned along a second row of seats within a passenger compartment of the vehicle.

18. The vehicle of claim 16, wherein the one or more seats includes a middle seat and a side seat adjacent to the middle seat, the middle and side seats being positioned along a third row of seats within a passenger compartment of the vehicle.

19. The vehicle of claim 16, further comprising a cargo area disposed behind the seat assembly, wherein the cargo area is accessible from a cabin of the vehicle via the latch release mechanism of the seat assembly.

20. The vehicle of claim 19, wherein the given seat further includes a secondary actuator along a rear of the given seat, the secondary actuator being accessible from a cargo area in order to fold down the given seat.

* * * * *

UNITED STATES PATENT AND TRADEMARK OFFICE
CERTIFICATE OF CORRECTION

| | |
|---|---|
| PATENT NO. | : 11,731,546 B1 |
| APPLICATION NO. | : 16/927279 |
| DATED | : August 22, 2023 |
| INVENTOR(S) | : Zhaokun Wang et al. |

It is certified that error appears in the above-identified patent and that said Letters Patent is hereby corrected as shown below:

In the Claims

Claim 5, Column 12, Line 14:
Now reads: "side surfaces and rear surfaces"; should read -- side surface and rear surface --

Signed and Sealed this
Tenth Day of October, 2023

*Katherine Kelly Vidal*

Katherine Kelly Vidal
*Director of the United States Patent and Trademark Office*